US012761582B2

(12) United States Patent
Osada et al.

(10) Patent No.: US 12,761,582 B2
(45) Date of Patent: Oct. 13, 2026

(54) IMAGE FORMING APPARATUS

(71) Applicant: CANON KABUSHIKI KAISHA, Tokyo (JP)

(72) Inventors: Hikaru Osada, Kanagawa (JP); Shinsuke Kobayashi, Kanagawa (JP); Akisato Sakaki, Kanagawa (JP); Isamu Takeda, Tokyo (JP); Jun Hara, Kanagawa (JP); Yusuke Shimizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/181,654

(22) Filed: Apr. 17, 2025

(65) Prior Publication Data

US 2026/0161116 A1 Jun. 11, 2026

(30) Foreign Application Priority Data

Apr. 24, 2024 (JP) ................................ 2024-070813

(51) Int. Cl.
*G03G 15/01* (2006.01)
*G03G 15/08* (2006.01)
*G03G 21/16* (2006.01)

(52) U.S. Cl.
CPC ..... *G03G 15/0896* (2013.01); *G03G 15/0121* (2013.01); *G03G 15/0863* (2013.01); *G03G 15/0877* (2013.01); *G03G 21/1676* (2013.01); *G03G 2221/163* (2013.01)

(58) Field of Classification Search
CPC ........... G03G 15/0121; G03G 15/0863; G03G 15/0877; G03G 15/0896; G03G 21/1676
USPC ................................................. 399/119, 227
See application file for complete search history.

(56) References Cited

U.S. PATENT DOCUMENTS 8,369,722 B2 * 2/2013 Takasaka ........... G03G 15/0121 399/227

FOREIGN PATENT DOCUMENTS

JP H07-295358 A 11/1995
JP H08-339111 A 12/1996
JP H11-38741 A 2/1999

(Continued)

OTHER PUBLICATIONS

Takanori Watanabe et al., U.S. Appl. No. 19/186,733, filed Apr. 23, 2025.

(Continued)

*Primary Examiner* — Hoan H Tran
(74) *Attorney, Agent, or Firm* — VENABLE LLP

(57) ABSTRACT

A developer cartridge is attachable/detachable to/from an image forming apparatus. The image forming apparatus has a rotary containing the cartridge; and a control unit to control the drive unit to rotate the rotary. The control unit rotates the rotary to a first rotational phase for replacing the cartridge; rotates the rotary to a second rotational phase when developing an image; and rotates the rotary in the first rotational phase so as to pass through a third rotational phase more than once and then reach the second rotational phase when performing an image forming operation for a first time after the cartridge is replaced. When the rotary is located in the third rotational phase, the direction from the discharge opening of the cartridge toward the receiving opening is a downward direction.

8 Claims, 15 Drawing Sheets

(56) References Cited

FOREIGN PATENT DOCUMENTS

JP 2007-183305 A 7/2007

OTHER PUBLICATIONS

Isamu Takeda et al., U.S. Appl. No. 19/181,666, filed Apr. 17, 2025.
Yusuke Shimizu et al., U.S. Appl. No. 19/098,247, filed Apr. 2, 2025.

* cited by examiner

IMAGE FORMING APPARATUS

BACKGROUND OF THE INVENTION

Field of the Invention

The present invention relates to an image forming apparatus that forms an image on a recording material using a developer.

Description of the Related Art

In the field of electrophotographic image forming apparatuses, a rotary developing method is known in which a color image is formed by rotating a rotary having a plurality of developing rollers. Japanese Patent Application Laid-Open No. 2007-183305 describes an image forming apparatus that includes a rotary having a plurality of developing rollers, and a plurality of toner cartridges (toner containers) that are attachable to and detachable from the rotary.

In this rotary developing type of image forming apparatus, toner in each toner cartridge is fed to a developer unit connected to the toner cartridge at an opening. When the toner in the developer unit is low, only the toner cartridge needs to be replaced with a new one, and the developer unit can be used as it is, which is advantageous.

SUMMARY OF THE INVENTION

However, when the toner cartridge is replaced, the amount of toner remaining in the developer unit may not be sufficient either. In this case, since the toner cartridge is separate from the developer unit, a feeding operation is required until a sufficient amount of toner is fed to the developer unit after the toner cartridge is replaced. If a printing operation is performed without a sufficient amount of toner fed to the developer unit, the toner from the toner cartridge will not be fed to the developer unit in time, which may result in an image defect due to the insufficient amount of toner being fed.

The present invention eliminates the deficiency of toner in a developer unit after the replacement of a toner cartridge.

An aspect of the present invention provides An image forming apparatus to and from which a cartridge containing a developer is attachable and detachable, the image forming apparatus comprising: a rotary capable of containing the cartridge attached thereto and including a developing unit configured to contain the developer supplied from a discharge opening of the cartridge; a drive mechanism configured to rotate the rotary; and a controller configured to control the drive mechanism, wherein the developing unit has a receiving opening for receiving the developer supplied from the discharge opening, the controller comprises: at least one memory storing instructions; and at least one processor that is in communication with the at least one memory and that, when executing the instructions, cooperates with the at least one memory to execute processing, the processing including: controlling the drive mechanism to rotate the rotary to a first rotational phase in which the cartridge is able to be replaced when replacing the cartridge; rotating the rotary to a second rotational phase when developing an image using the developer supplied from the cartridge and contained in the developing unit; and controlling the drive mechanism to rotate the rotary in the first rotational phase so as to pass through a third rotational phase more than once and then reach the second rotational phase when an image forming operation is performed for a first time after the cartridge is replaced, if it is determined that a predetermined condition is satisfied, when the rotary is located in the first rotational phase, a direction from the discharge opening toward the receiving opening is an upward direction, and when the rotary is located in the third rotational phase, the direction from the discharge opening toward the receiving opening is a downward direction.

According to the above configuration, the deficiency of toner in a developer unit after the replacement of a toner cartridge can be eliminated.

Further features of the present invention will become apparent from the following description of exemplary embodiments with reference to the attached drawings.

DESCRIPTION OF THE EMBODIMENTS

Figure 1:
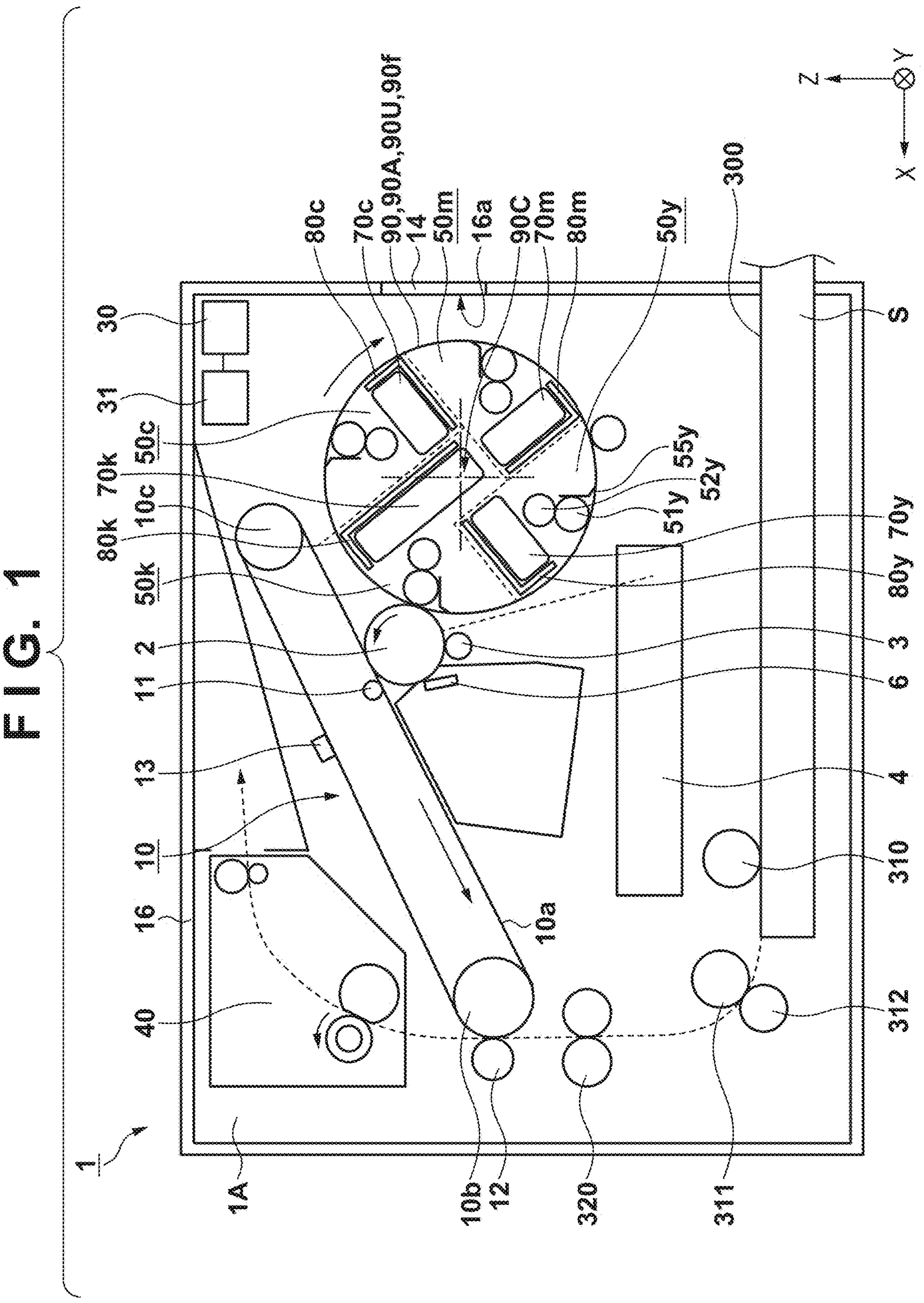
FIG. 1 is a schematic cross-sectional view showing a schematic configuration of an image forming apparatus according to Embodiment 1.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Embodiment 1

An image forming apparatus 1 according to Example 1 will be described with reference to FIGS. 1 and 5 C. In the following description and drawings, the Z direction refers to the vertical direction when the image forming apparatus 1 is installed on a horizontal plane. The Y direction refers to a direction intersecting with the Z direction and the direction of a rotation axis 90C of a later-described rotary body 90 (the direction of the rotation axis of the rotary). The rotary body may be referred to as a rotary. The X direction refers to a direction intersecting with both the Z direction and the Y direction. The X direction and the Y direction are preferably horizontal. Further, the X direction, the Y direction, and the Z direction are preferably orthogonal to each other. The directions of arrows X, Y, and Z shown in each drawing are denoted as +X side, +Y side, and +Z side, respectively, and the opposite sides are denoted as −X side, −Y side, and −Z side, respectively.

Overall Configuration of Image Forming Apparatus

First, an overall configuration of the image forming apparatus 1 is described. The image forming apparatus 1 is a laser beam printer that forms an image on a sheet S by an electrophotographic method. More specifically, the image forming apparatus 1 is a color laser beam printer that includes four developing units 50*y*, 50*m*, 50*c*, and 50*k*. The sheet S, which is a recording material (recording medium), may be any of various sheet materials of different sizes and materials, including paper such as plain paper and thick paper, surface-treated sheet materials such as plastic film, cloth, and coated paper, and sheet materials having special shapes such as envelopes and index paper.

Figure 2A:
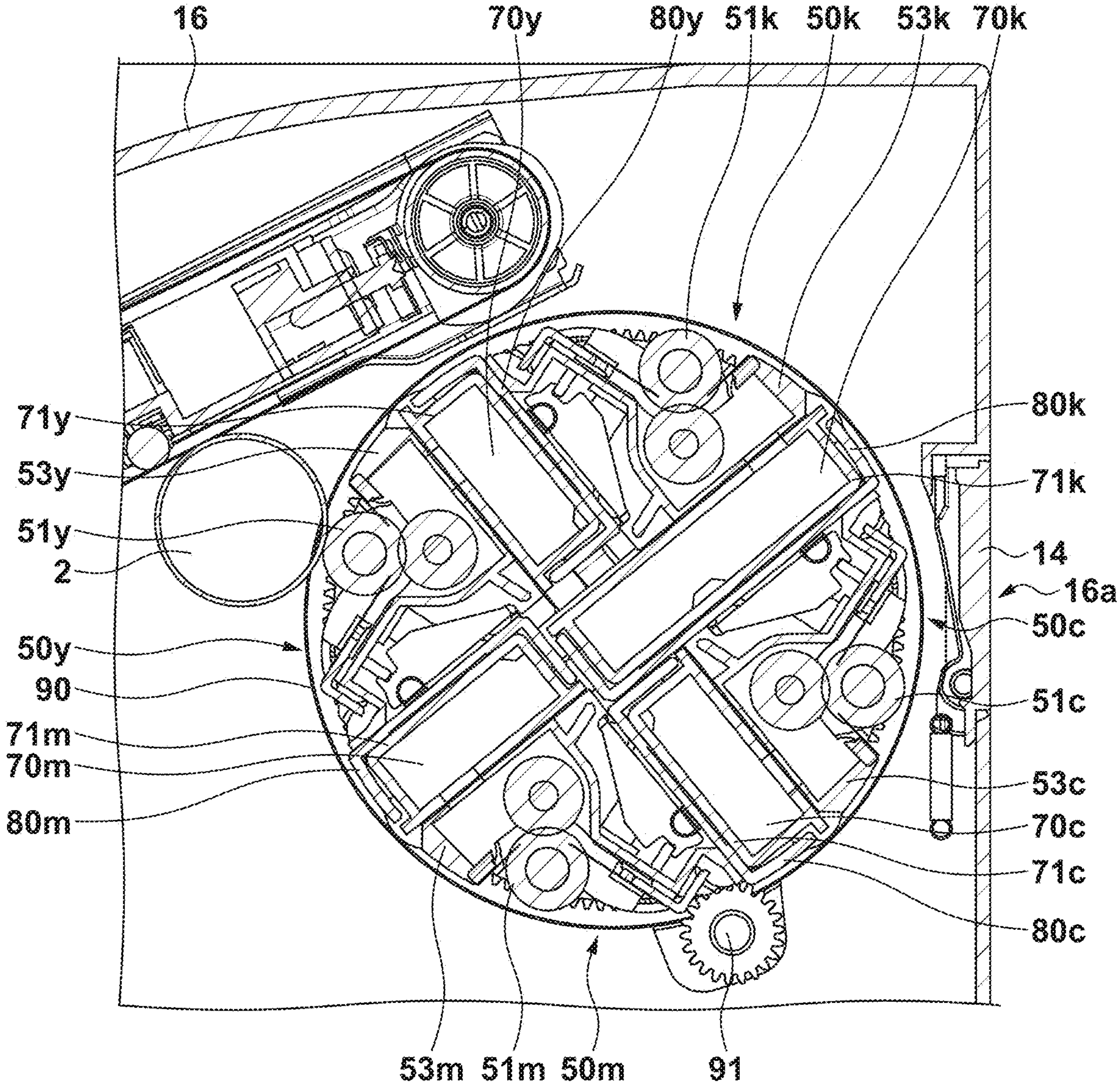
FIGS. 2A and 2B are cross-sectional views of the image forming apparatus according to Embodiment 1.
Figure 2B:
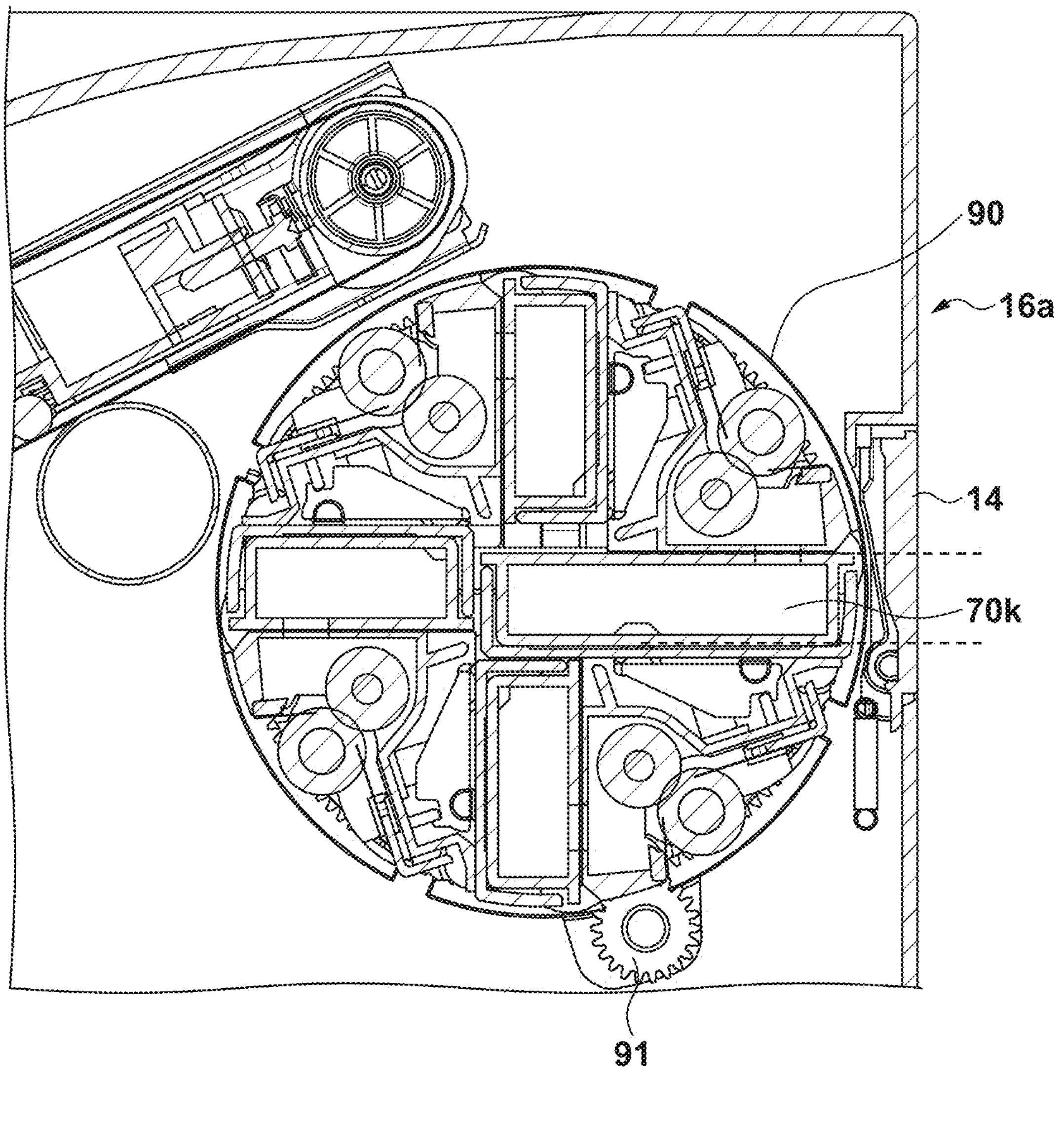
Figure 3:
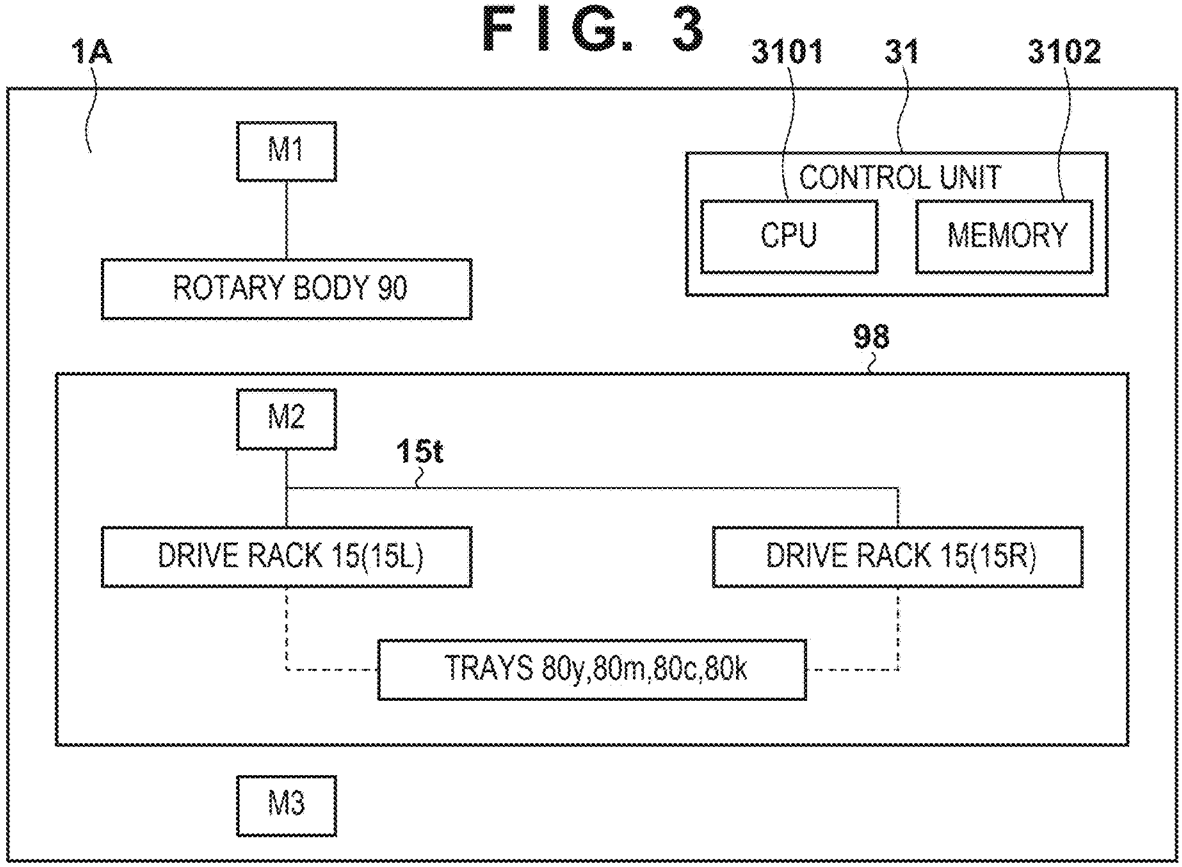
FIG. 3 shows a driving source of an image forming apparatus according to Embodiment 1.

A schematic configuration and an image forming operation of the image forming apparatus 1 are described with reference to FIGS. 1, 2A, 2B, and 3. FIG. 1 is a schematic view showing a cross-sectional configuration of the image forming apparatus 1. FIGS. 2A and 2B are conceptual diagrams showing a cross section of a toner cartridge 70 and a configuration of feeding toner from the toner cartridge 70 to a developing unit 50. FIG. 3 illustrates a driving source of the image forming apparatus 1.

Here, subscripts y, m, c, and k attached to the developing units 50*y*, 50*m*, 50*c*, and 50*k*, the toner cartridges 70*y*, 70*m*, 70*c*, and 70*k*, the trays 80*y*, 80*m*, 80*c*, and 80*k*, and so on, indicate the colors of toner. The subscripts y, m, c, and k correspond to yellow, magenta, cyan, and black, respectively.

As shown in FIG. 1, the image forming apparatus 1 has an image forming apparatus body (hereinafter, "apparatus body") 1A, and toner cartridges 70*y*, 70*m*, 70*c*, and 70*k* as toner containers attachable to and detachable from the apparatus body 1A. The apparatus body 1A in this example is a portion of the image forming apparatus 1 excluding the toner cartridges 70*y*, 70*m*, 70*c*, and 70*k*.

The apparatus body 1A of the image forming apparatus 1 includes an electrophotographic photosensitive member (hereinafter, "photosensitive drum") 2 having a drum shape (cylindrical shape) as an image carrier for carrying an electrostatic latent image. A charging roller 3, a scanner 4 as an exposure device, and a cleaning unit 6 are arranged around the photosensitive drum 2.

The charging roller 3 is an example of a charging mechanism for uniformly charging the photosensitive drum 2. The scanner 4 is an example of an exposure mechanism for exposing the photosensitive drum 2 by irradiating it with a laser beam corresponding to image information. An electrostatic latent image is formed on both sides of the photosensitive drum 2 by irradiating the charged photosensitive drum 2 with a laser beam. The cleaning unit 6 is an example of a cleaning mechanism for removing toner remaining on the surface of the photosensitive drum 2.

The apparatus body 1A also includes a video controller 30 that receives image information from an external device (not shown) such as a host computer, and a control unit 31 that transmits a print signal for the received image information.

Further, the apparatus body 1A includes a sheet container 300, a pick-up roller 310, a feed roller 311, a separation roller 312, a transport roller pair 320, a secondary transfer roller 12, a fixing device 40, and an intermediate transfer unit 10. The pick-up roller 310 is an example of a feeding mechanism for feeding the sheet S. The feed roller 311 and the separation roller 312 are examples of separation and transport units that transport sheets S while separating the sheets S one by one by friction force. The secondary transfer roller 12 is an example of a transfer mechanism that transfers an image from an intermediate transfer belt 10*a* to the sheet S.

The intermediate transfer unit 10 includes an intermediate transfer belt 10*a*, a belt drive roller 10*b*, a tension roller 10*c*, a cleaning device 13, and a primary transfer roller 11. The intermediate transfer belt 10*a* is an example of an intermediate transfer body that carries an image to be transferred (primary transfer) from the photosensitive drum 2 and transports the image to transfer it onto the sheet S (secondary transfer). The intermediate transfer belt 10*a* is stretched over the belt drive roller 10*b* and the tension roller 10*c*. The belt drive roller 10*b* is a drive member that is driven to rotate by a driving source to transport the intermediate transfer belt 10*a*.

The apparatus body 1A also includes a rotary body (rotary, rotating body) 90 having developing units 50*y*, 50*m*, 50*c*, and 50*k*. As will be described later, trays 80*y*, 80*m*, 80*c*, and 80*k* are attached to the rotary body 90 in this example. The toner cartridges 70*y*, 70*m*, 70*c*, and 70*k* are removably attached to the respective trays 80*y*, 80*m*, 80*c*, and 80*k*. That is, the rotary body 90 is capable of containing a plurality of toner cartridges 70. The toner cartridge 70*k* is an example of a first toner cartridge. The toner cartridge 70*m* is an example of a second toner cartridge. The toner cartridge 70*y* is an example of a third toner cartridge. The toner cartridge 70*c* is an example of a fourth toner cartridge. These are examples, and any color may be denoted by any number, if it is unique. This also applies to the trays 80.

The tray 80*k* is an example of a first support member for supporting the first toner cartridge. The tray 80*m* is an example of a second support member for supporting the second toner cartridge. The tray 80*y* is an example of a third support member for supporting the third toner cartridge. The tray 80*c* is an example of a fourth support member for supporting the fourth toner cartridge.

Each of the developing units 50*y*, 50*m*, 50*c*, and 50*k* is an example of a developing means for developing an electrostatic latent image formed on the photosensitive drum 2 into a toner image by using a toner of the corresponding color. The developing units 50*y*, 50*m*, 50*c*, and 50*k* develop the electrostatic latent image formed on the photosensitive drum 2 using yellow toner, magenta toner, cyan toner, and a black toner, respectively.

The developing unit 50*y* has a developing roller 51*y*, a supply roller 52*y*, and a developing blade 55*y*. As shown in FIG. 2A, the developing units 50*y*, 50*m*, 50*c*, and 50*k* are each formed in a chamber shape having a space inside formed by developing frames 53*y*, 53*m*, 53*c*, and 53*k*. The developing roller 51*y* is a developer carrier that rotates while carrying toner as a developer and supplies it to the photosensitive drum 2. The supply roller 52*y* is a supply member that is disposed in contact with the developing roller 51*y* and supplies toner to the developing roller 51. The developing blade 55_y_ is a regulating member for regulating the thickness of a toner layer carried on the developing roller 51_y_. The other developing units 50_m_, 50_c_, and 50_k_ also have similar developing rollers 51_m_, 51_c_, and 51_k_, supply rollers 52_m_, 52_c_, and 52_k_, and developing blades 55_m_, 55_c_, and 55_k_.

Rotary Configuration

The rotary body 90 is constituted by a rotary frame 90_f_ and the developing units 50_y_, 50_m_, 50_c_, 50_k_. That is, the rotary body 90 is constituted by the developing units 50_y_, 50_m_, 50_c_, and 50_k_ assembled to the rotary frame 90_f_.

Further, the trays 80_y_, 80_m_, 80_c_, and 80_k_ are attached to the rotary body 90. The combination of the rotary body 90 and the trays 80_y_, 80_m_, 80_c_, and 80_k_ can be referred to as a rotary unit 90U. In other words, the rotary unit 90U includes the rotary body 90 and the trays 80_y_, 80_m_, 80_c_, and 80_k_. The rotary body 90 may also be referred to as a rotary 90.

The toner cartridges 70_y_, 70_m_, 70_c_, and 70_k_ are held such that they can be attached to and detached from the trays 80_y_, 80_m_, 80_c_, and 80_k_, respectively. The toner cartridges 70_y_, 70_m_, 70_c_, and 70_k_ contain toner of the respective colors inside their main bodies formed by cartridge frames 71_y_, 71_m_, 71_c_, and 71_k_, respectively.

The rotary unit 90U with the toner cartridges 70_y_, 70_m_, 70_c_, and 70_k_ attached thereto can be referred to as a rotary assembly 90A.

The rotary body 90 can rotate about the rotation axis (rotation center) 90C. The rotation axis 90C matches the rotation axes of the rotary frame 90_f_, the rotary unit 90U, and the rotary assembly 90A. The rotation axis 90C is substantially parallel to the rotation axis (rotation center) of the photosensitive drum 2.

The rotary body 90 rotates about the rotation axis 90C, thereby allowing any of the developing rollers 51_y_, 51_m_, 51_c_, and 51_k_ to be located at a development position where it faces the photosensitive drum 2.

Development Position, Replacement Position, and Retraction Position

The apparatus body 1A is housed in a frame 16, which has an opening 16_a_ for discharging the tray 80 to the outside of the apparatus and replacing the toner cartridge 70. Further, a door 14 for opening and closing the opening 16_a_ is provided.

FIG. 2A shows a cross section in the vicinity of the rotary body 90 when the developing roller 51_y_ is in a position facing the photosensitive drum 2. The rotary body 90 is supported so as to be pivotable about a pivot shaft 91. In the development position shown in FIG. 2A, the rotary 90 is biased by a biasing member (not shown), thereby causing the developing roller 51_y_ to come into contact with the photosensitive drum 2. In the process of rotating the rotary 90 clockwise in the figure and moving it to a replacement position, namely the position for replacing the toner cartridge 70_k_ shown in FIG. 2B, the rotary 90 is pivoted about the pivot shaft 91 by a separation mechanism (not shown), and the developing roller 51_y_ is separated from the photosensitive drum 2.

The position of the developing roller 51_y_ facing the photosensitive drum 2 as shown in FIG. 2A is referred to as a yellow development position. Similarly, the position of the developing roller 51_m_ facing the photosensitive drum 2 is referred to as a magenta development position. The position of the developing roller 51_c_ facing the photosensitive drum 2 is referred to as a cyan development position. The position of the developing roller 51_k_ facing the photosensitive drum 2 is referred to as a black development position. The rotary body 90 can change the developing roller to face the photosensitive drum 2 by rotating around the rotation axis 90C.

Meanwhile, by rotating about the rotation axis 90C, the rotary body 90 can also assume a position where the developing rollers 51_y_, 51_m_, 51_c_, and 51_k_ do not face the photosensitive drum 2.

FIG. 2B shows a cross section in the vicinity of the rotary body 90 in the state where the toner cartridge 70_k_ containing black toner is replaced. At this time, the toner cartridge 70_k_ is in a state of being stopped at a position facing the opening 16_a_ and the door 14 provided in the apparatus body 1A. This position is referred to as a replacement position of the toner cartridge 70_k_. After the tray 80_k_ is slid from this replacement position to the outside of the rotary body 90, the user can replace the toner cartridge 70_k_. This position is called a retraction position of the toner cartridge. That is, in order to move a specific toner cartridge 70 between the replacement position and the retraction position, it is not necessary to rotate the rotary 90 and the tray 80 only needs to perform a sliding movement.

Note that the position of the toner cartridge 70 when housed in the rotary body 90 may be referred to as an attachment position, as opposed to the retraction position in which the toner cartridge 70 is outside the apparatus. The replacement position and the development position are positions determined by the rotational phase of the rotary 90, while the attachment position and the retraction position are positions determined by the sliding movement of the tray 80. Note that the rotational phase refers to, for example, the angular displacement in a polar coordinate system with the rotation axis of the rotary body 90 as the origin. For example, each of the replacement position, the development position, or a later-described feeding position is in a direction of a predetermined angular displacement with the rotation axis of the rotary body 90 as the origin. The radial distance of these positions is approximately the radius of the rotary body 90. Although the term "rotational phase" is used in this embodiment, it may be replaced with "angular displacement" for the reason described above. Thus, for example, a term such as a "first rotational phase" may be replaced with a "first angular displacement".

Here, in this embodiment, the exterior surface of the apparatus body 1A is formed by the exterior surface of the frame 16. That is, the outside of the apparatus can also be considered as the outside of the frame 16. Accordingly, the retraction position can also be considered as a position where at least a portion of the toner cartridge 70 is outside the apparatus, and a position where at least a portion of the toner cartridge 70 protrudes from the opening 16_a_ of the frame 16 of the apparatus body 1A toward the outside of the frame 16.

When the door 14 is in the closed position as shown in FIG. 2B, the opening 16_a_ of the frame 16 of the apparatus body 1A is covered by the door 14. A portion of the exterior surface of the apparatus body 1A is formed by an exterior surface 14_a_ of the door 14 in the closed position. In this case, the "outside of the apparatus" refers to the side outward of the exterior surface 14_a_ of the door 14 in the closed position. That is, with the position of the exterior surface 14_a_ of the door 14 in the closed position defined as an exterior position, at least a portion of the toner cartridge 70 when in the retraction position is located outside the apparatus body 1A relative to the exterior position. In other words, if the door 14 is in the closed position, at least a portion of the toner cartridge 70 is located in a space outside the apparatus body 1A.

As shown in FIG. 3, the apparatus body 1A includes a control unit 31 and motors M1, M2, and M3 as driving sources controlled by the control unit 31. The control unit 31 includes a memory 3102 storing a program and a CPU 3101 (or a processor), and the CPU 3101 executes the program stored in the memory 3102 to implement a control procedure for the motors or the like. As will be described later, the motor M1 supplies a driving force for rotating the rotary body 90 about the rotation axis 90C. In other words, the motor M1 rotates the rotary assembly 90A and the rotary unit 90U about the rotation axis 90C.

The apparatus body 1A also includes a drive device 98 that includes the motor M2 and a transmission device. The transmission device includes drive racks 15L and 15R serving as later-described drive gears, and a transmission unit 15*t*. The driving force of the motor M2 is transmitted to the drive racks 15L and 15R by the transmission unit 15*t*. In other words, the motor M2 is configured to drive the drive racks 15L and 15R, via which the trays 80*y*, 80*m*, 80*c*, and 80*k* are moved to be inserted into or ejected from the rotary body 90. The drive racks 15 L and 15 R are also collectively referred to as the drive racks 15.

The motor M3 drives members other than those driven by the motors M1 and M2. For example, the motor M3 drives the photosensitive drum 2, the developing units 50*y*, 50*m*, 50*c*, and 50*k*, the pick-up roller 310, the feed roller 311, the transport roller pair 320, the secondary transfer roller 12, the belt drive roller 10*b*, and the fixing device 40.

Note that the members driven by the motors M1, M2, and M3 can be changed as appropriate. Also, the roles of any two or all three of the motors M1, M2, and M3 can be integrated into one motor. On the other hand, a driving source other than the motors M1, M2, and M3 may also be added.

Replacing Operation of Toner Cartridge

Figure 14A:
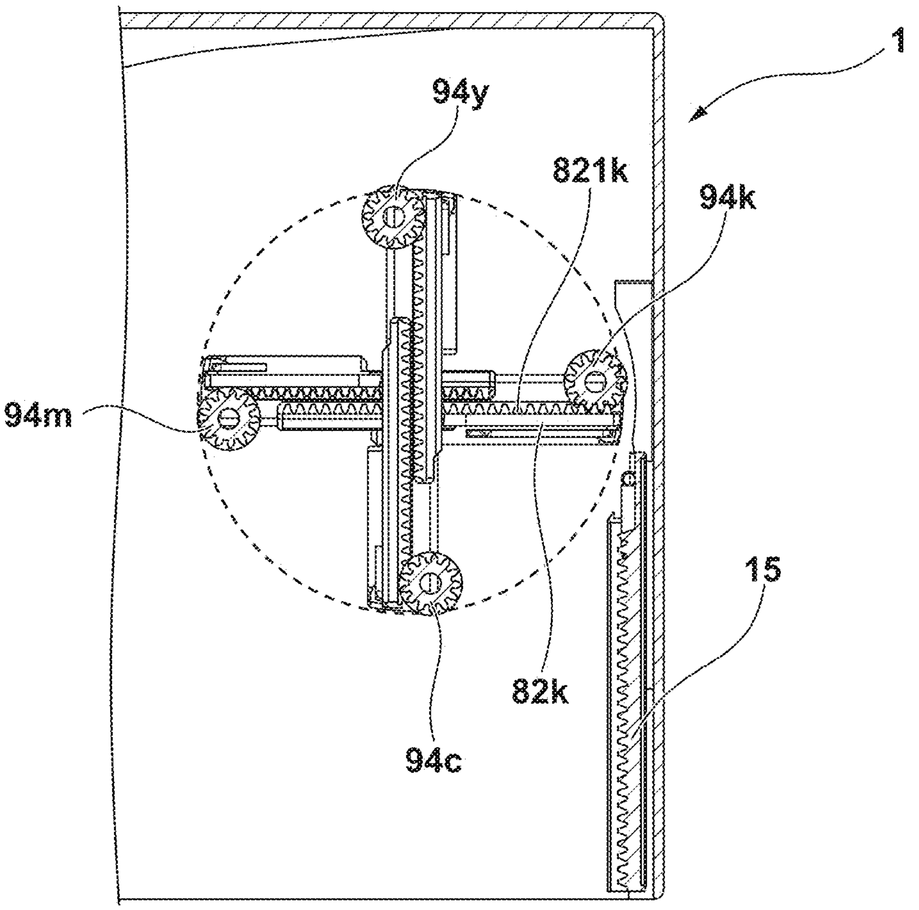
FIGS. 14A and 14B are cross-sectional view showing the drive configuration for inserting and removing a tray.
Figure 14B:
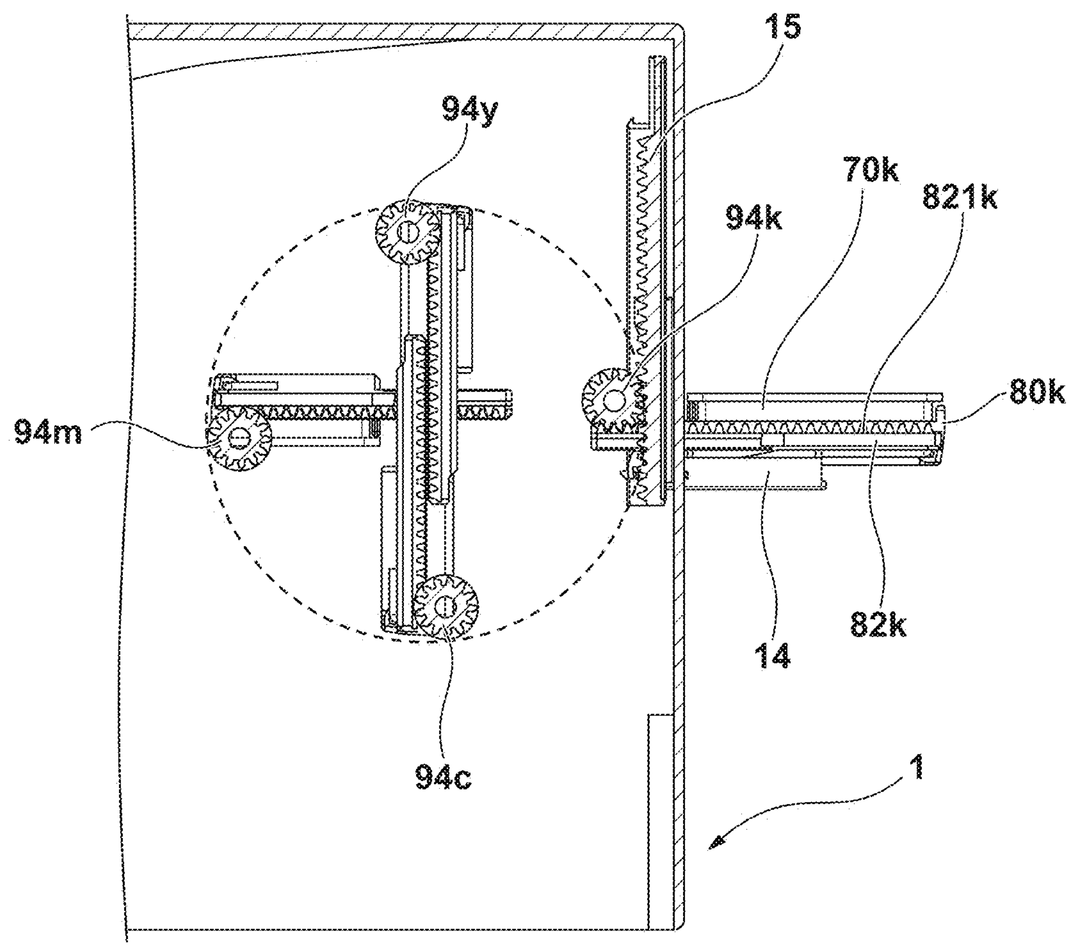

FIGS. 14A and 14B show cross sections of a region around the rotary 90 when replacing a toner cartridge. As shown in FIG. 14B, when a toner cartridge is replaced, the user performs an operation to attach and detach the toner cartridge 70*k* to and from the tray 80. Thus, the entire toner cartridge 70*k* protrude from the front surface of the image forming apparatus body 1A. A toner tray detection sensor is provided, so that it is possible to determine whether the tray 80*k* has been inserted and completely accommodated. Although the case of the toner cartridge 70*k* is described as an example, the same applies to the other toner cartridges.

As an example of a drive transmission mechanism (not shown), a mechanism used in this embodiment is configured such that, for example, a rack is disposed along the sliding direction of the tray 80, and a gear engaging with the rack is driven to rotate, thereby taking in and out the tray in the replacement position or the retraction position to and from the rotary. This configuration will be described with reference to FIGS. 11 to 14B.

Tray Arrangement in Rotary

Figure 11:
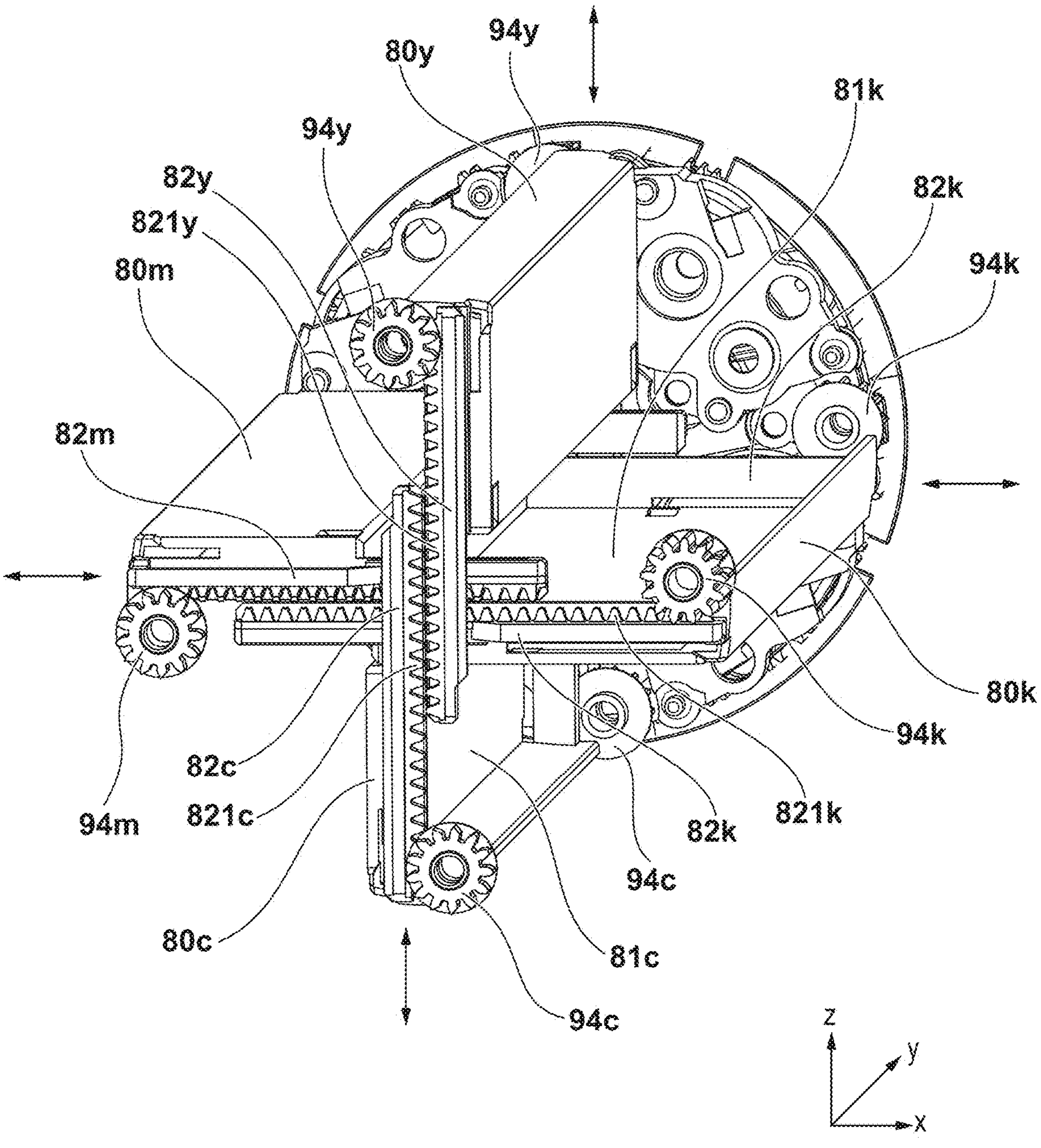
FIG. 11 is a perspective view showing the arrangement of trays 80*y* to 80*k* in a rotary 90.
Figure 12:
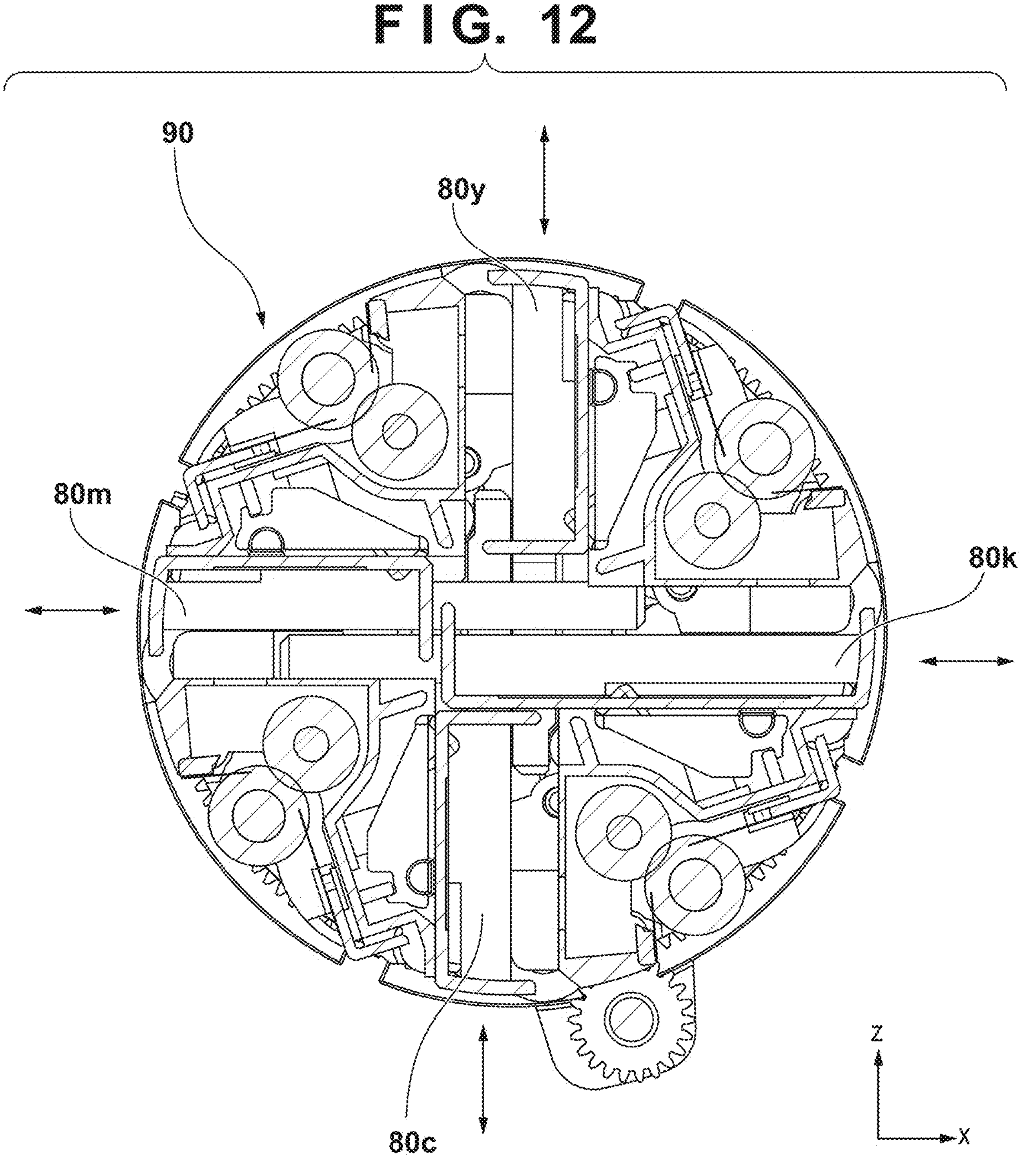
FIG. 12 is a cross-sectional view showing the arrangement of the trays 80*y* and 80*k* in the rotary 90.

The arrangement of the trays 80*y* to 80*k* in the rotary 90 will be described with reference to FIGS. 11 and 12. FIG. 11 is a perspective view showing the arrangement of the trays 80*y* to 80*k* in the rotary 90. FIG. 12 is a cross-sectional view showing the arrangement of the trays 80*y* and 80*k* in the rotary 90.

As shown in FIG. 11, the trays 80*y* to 80*k* are provided with toner cartridge holders 81*y* to 81*k* and tray rails 82*y* to 82*k*, respectively (the toner cartridge holders 81*m* to 81*k* are not shown). The tray rails 82*y* to 82*k* are located at two ends of the toner cartridge holders 81*y* to 81*k*, respectively. Racks 821*y* to 821*k* are formed on the tray rails 82*y* to 82*k*. Rack gears 94*y* to 94*k* are rotatably held in the rotary 90 and engage with the respective racks 821*y* to 821*k* so as to be able to transmit the driving force.

As shown in FIGS. 11 and 12, the four trays 80*y* to 80*k* are arranged in an overlapping manner each other in the rotary 90. The directions in which the trays are inserted and removed are different from each other by 90 degrees in a circumferential direction (the directions of the arrows in the figure). Therefore, the yellow tray 80*y* and the cyan tray 80*c* are held so as to be slidable in the same direction, and the magenta tray 80*m* and the black tray 80*k* are held so as to be slidable in the same direction. Each tray is displaced between the replacement position where it is housed in the rotary 90 and the retraction position where it is outside the rotary 90.

Drive Configuration for Tray Insertion and Removal

Figure 13A:
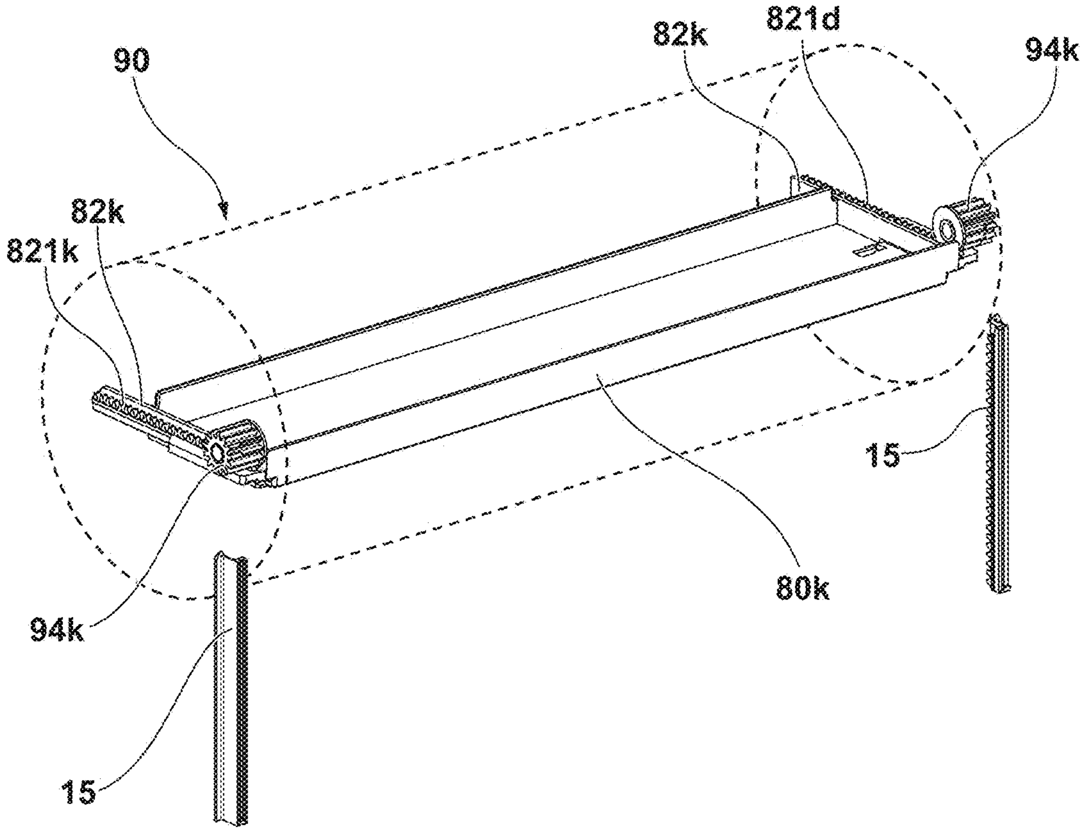
FIGS. 13A and 13B are perspective views showing a drive configuration for inserting and removing a tray.
Figure 13B:
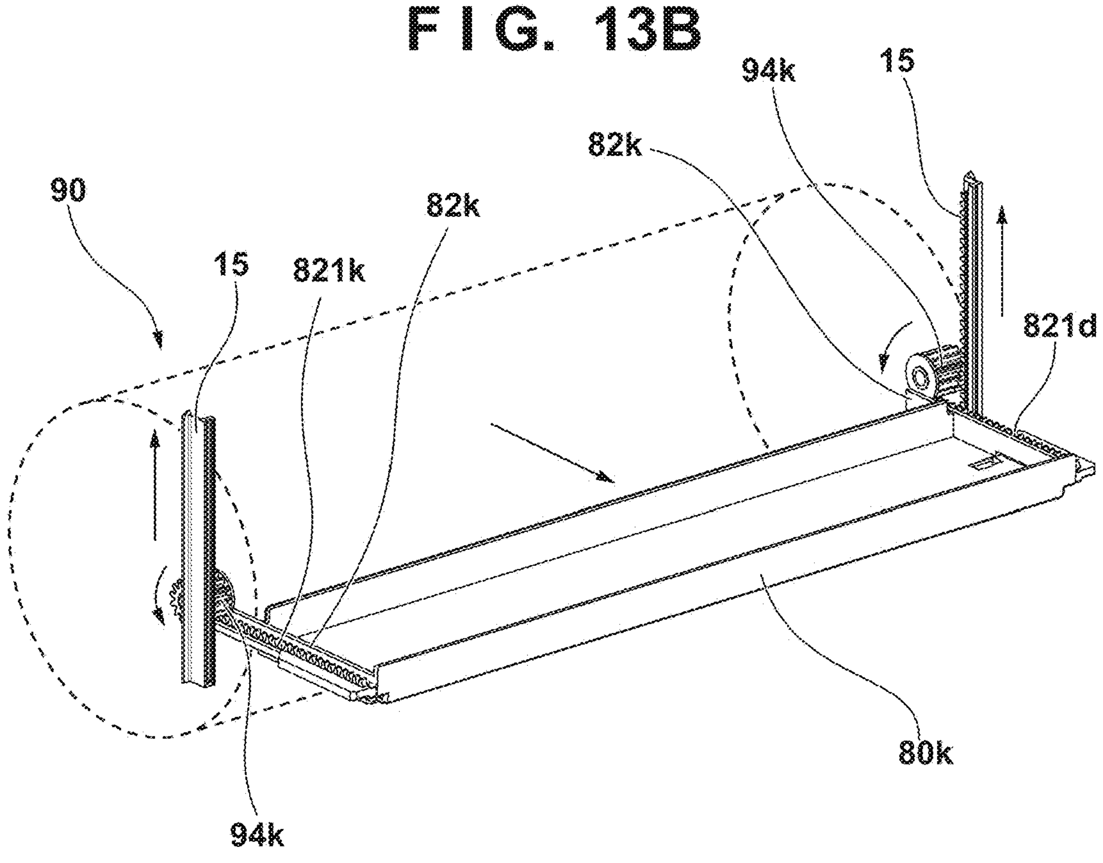

A drive configuration for insertion and removal of the trays 80*y* to 80*k* arranged in the rotary 90 will be described with reference to FIGS. 13A to 14B. FIGS. 13A and 13B are perspective views showing the drive configuration for tray insertion and removal. FIGS. 14A and 14B are cross-sectional views showing the drive configuration for tray insertion and removal.

FIG. 13A shows the tray 80*k* located inside the rotary 90 (i.e., the state where the toner cartridge 70*k* is attached to the developing unit 50*k*). The rotational phase of the rotary 90 in which the tray or cartridge is positioned in this manner is referred to as a "first rotational phase". FIG. 13B shows the tray 80*k* that has slid to the outside of the rotary 90. At this time, the door 14 is open. Two racks 821*k* are formed at both ends, as mentioned above. Further, two rack gears 94*k* and two drive racks 15 are arranged at positions corresponding to the racks 821*k* at the respective ends. The tray 80*k* is held so as to be slidable in a direction parallel to the tray rails 82*k* relative to the rotary 90. The drive racks 15 are held so as to be slidable in the up-down direction relative to the image forming apparatus body 1A. Although only the tray 80*k* out of the four trays 80*y* to 80*k* is shown here, the same applies to the drive configuration for insertion and removal of the trays 80*y* to 80*k*.

A description will be given, with reference to FIGS. 14A and 14B, of a tray insertion and removal operation in which the tray 80*k* is slid from inside the rotary 90 (the position where the toner cartridge 70*k* is attached to the developing unit 50*k*) to the outside. The operation of inserting and removing the tray 80*k* is performed with the driving source (not shown), the drive racks 15, the rack gears 94*k*, and the racks 821*k*. First, the drive racks 15 are slid upward relative to the image forming apparatus body 1A by the driving force transmitted by the driving source, and transmit the driving force to the rack gears 94*k*. The rack gears 94*k* rotate counterclockwise and transmit the driving force to the racks 821*k*, thereby sliding the tray 80*k* from the position where the toner cartridge 70*k* is attached to the developing unit 50*k* toward the outside of the rotary 90. The door 14 may be opened in conjunction with this operation or by being pushed by the tray 80.

After the toner cartridge is replaced, the operation of sliding the tray 80*k* into the rotary 90 can be performed by driving the driving source to rotate in a direction opposite to the rotation direction when sliding the tray 80*k* to the outside of the rotary 90. In this case, the tray 80*k* is pulled to the inside of the rotary 90 due to the drive racks 15 sliding downward relative to the image forming apparatus body 1A. Note that "the inside of the rotary 90" means the position where the toner cartridge 70*k* is attached to the developing unit 50*k*. The door 14 may be closed in conjunction with this operation or by being biased by a spring or the like in a closing direction, or may be manually closed.

As mentioned above, the toner cartridge 70 is movable relative to the developing frame 53 between the attachment position and the retraction position where the toner cartridge 70 is retracted from the attachment position. The toner cartridge 70 in the retraction position can be replaced. In the retraction position, the discharge opening 712 (see FIG. 4) of the toner cartridge 70 is open upward relative to the toner cartridge 70. Further, in this state, a receiving opening 532 (see FIG. 4) of the developing unit 50, into which the developer is supplied from the attached toner cartridge 70, is open downward relative to the developing unit 50. By moving into the rotary 90 the tray 80 on which the toner cartridge 70 in the retraction position is placed, the toner cartridge 70 moves to the attachment position. In this state, the rotary 90 is driven to rotate to the development position where the developing roller 51 of a target developing unit comes into contact with the photosensitive drum 2 for development.

Developing Unit

The developing units 50*y*, 50*m*, 50*c*, and 50*k* have the same basic configuration and functions. The toner cartridges 70*y*, 70*m*, 70*c*, and 70*k* have the same basic configuration and functions. Also, the trays 80*y*, 80*m*, 80*c*, and 80*k* have the same basic configuration and functions. Therefore, when there is no need to distinguish between them, the subscripts y, m, c, and k are omitted, and the description is given assuming that they are any one of the four units, cartridges, and trays. The subscripts y, m, c, and k represent the color components of the toner, and correspond to yellow, magenta, cyan, and black in this order.

Figure 4:
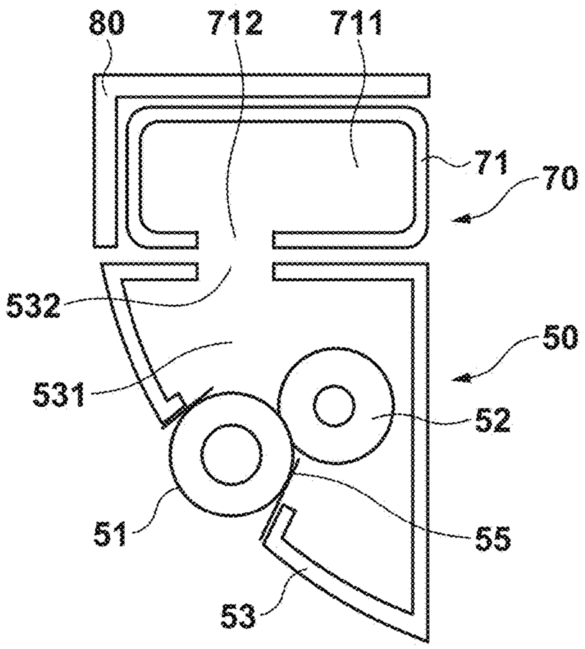
FIG. 4 is a schematic view of a developing unit and a toner cartridge according to Embodiment 1.

FIG. 4 schematically shows the tray 80, the toner cartridge 70, and the developing unit 50 arranged in the rotary body 90. FIG. 4 shows the toner cartridge 70 in the attached state.

As shown in FIG. 4, the toner cartridge 70 has the cartridge frame 71. The cartridge frame 71 includes a toner storage unit 711 for storing toner, and the discharge opening 712 in communication with the toner storage unit 711. The storage unit may be referred to as a container.

The developing unit 50 has the developing frame 53. The developing frame 53 includes a developing-side storage unit 531 and the receiving opening 532 in communication with the developing-side storage unit 531. The developing unit 50 may be referred to as a developing chamber. The receiving opening 532 of the developing unit 50 and the discharge opening 712 of the toner cartridge 70 may also be each referred to simply as an opening, or collectively referred to as openings.

The developing unit 50 also includes the developing roller 51, the supply roller 52, and the developing blade 55. The developing blade 55 is disposed in contact with the developing roller 51 so as to regulate the thickness of the toner layer carried by the developing roller 51.

When the toner cartridge 70 is attached and located in the attachment position relative to the developing frame 53 as shown in FIG. 4, the discharge opening 712 of the toner cartridge 70 is in a positional relationship to face the receiving opening 532 of the developing unit 50. That is, the storage unit 711 of the toner cartridge 70 and the developing-side storage unit 531 of the developing unit 50 are in communication with each other via the discharge opening 712 and the receiving opening 532.

This allows the toner stored in the storage unit 711 of the toner cartridge 70 to move to the developing-side storage unit 531 of the developing unit 50. When the toner cartridge 70 is located above the developing unit 50, the discharge opening 712 and the receiving opening 532 are located below the storage unit 711, which is inside the toner cartridge 70. Thus, the toner stored in the storage unit 711 flows into the developing-side storage unit 531 by gravity, and the toner is fed.

The discharge opening 712 in the cartridge 70 and the receiving opening 532 in the developing unit 50 need only be provided in a region where the toner storage unit 711 and the developing frame 53 are close to each other. The number of those openings (the discharge opening 712 and the receiving opening 532) as well as the arrangement and size thereof may be adjusted as appropriate.

When the toner cartridge 70 is not attached to the developing unit 50, it is desirable that the discharge opening 712 is covered by a sealing member so as to prevent the stored toner from flowing out. Similarly, when the toner cartridge 70 is not attached to the developing unit 50, it is desirable that the receiving opening 532 is covered by a sealing member so as to prevent the stored toner from flowing out. It is also desirable to provide a check valve or the like in the openings such that the toner fed from the toner cartridge 70 to the developing unit 50 will not flow back again to the toner cartridge 70. Note that if the check valve is provided in the developing unit 50, the sealing member for the receiving opening 532 may be omitted. Also, since the discharge opening 712 is in the opposite position to the receiving opening 532 and in communication therewith except during replacement, the tray 80 may be sealed and released manually.

Feeding Position

Figure 5A:
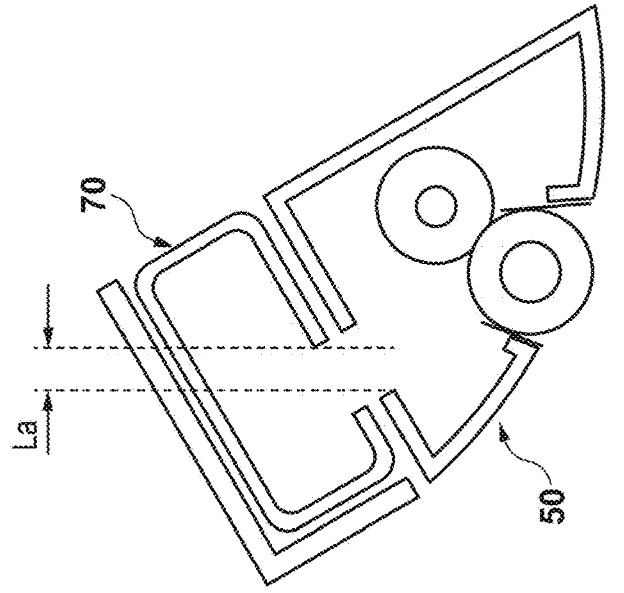
FIGS. 5A, 5B, and 5C are schematic views of the developing unit and the toner cartridge regarding a feeding position according to Embodiment 1.
Figure 5B:
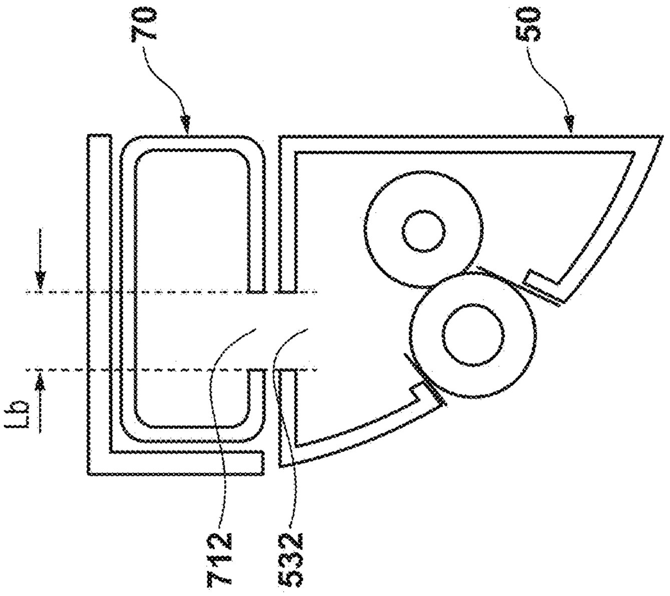
Figure 5C:
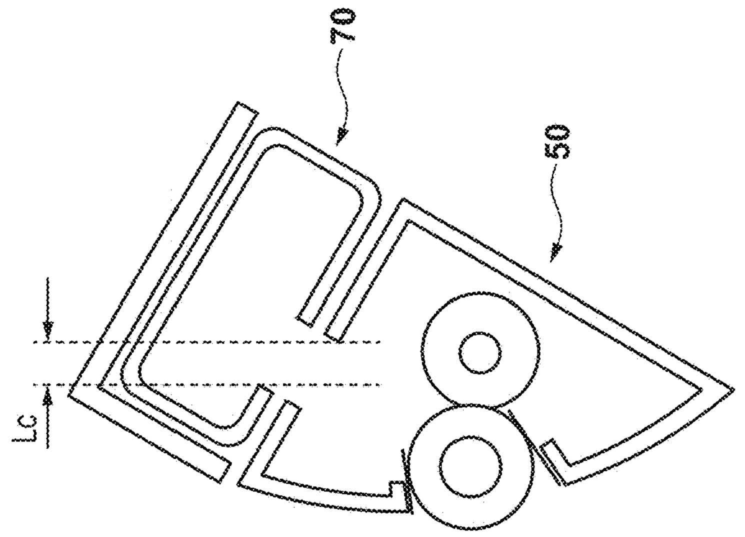

FIGS. 5A, 5B, and 5C schematically show the tray 80, the toner cartridge 70, and the developing unit 50 that are arranged in the rotary body 90, at different angles of the rotary body 90. As mentioned above, toner is fed into the developing unit 50 of this embodiment by gravity via the discharge opening 712 and the receiving opening 532.

An effective opening region for feeding the toner when the discharge opening 712 and the receiving opening 532 are in communication is defined as an effective opening. It can be said that more toner can be fed when the direction of projection when projected from the storage unit 711 toward the discharge opening 712 along the vertical direction is a downward direction, and the width of the projected effective opening is larger.

Comparing widths La, Lb, and Lc of the opening when projected in the vertical direction in FIGS. 5A, 5B, and 5C, the width Lb is the widest, and it can be said that the largest amount of toner can be fed in the case of that angle of the developing unit 50. The projection of the opening in the vertical direction of its length in the depth direction in FIGS. 5A, 5B, and 5C (downward in the figures) does not change depending on the rotational phase of the rotary 90, so that the area of the opening projected in the vertical direction is the largest when the width projected in the vertical direction reaches the largest width Lb. At this time, the opening needs to be oriented downward along the vertical direction as viewed from the storage unit 711, which is inside the toner cartridge. In this state, the largest amount of toner can be fed from the toner cartridge 70 to the developing unit 50. Note that when the opening 712 of the toner cartridge 70 is projected downward in the vertical direction as viewed from the storage unit 711, this state may be referred simply as “downward”. FIG. 5C shows the state of the developing unit 50 when, for example, the developing unit 50 performs developing (i.e., when the developing roller 51 develops a latent image formed on the photosensitive drum 2). In this state, the opening of the toner cartridge 70 faces downward along the vertical direction, but the projected area thereof is smaller than the projected area in the vertical direction of the opening of the toner cartridge 70 in the state shown in FIG. 5B.

Since toner, which is a powder, is not as fluid as a liquid, "bridging" may occur, and the angle shown in FIG. 5B is also the best from the viewpoint of avoiding it. The position in FIG. 5B where a large amount of toner can be fed most efficiently within the range in which the rotary body 90 can rotate is defined as the "feeding position." That is, the rotational phase of the rotary 90 where the area of the discharge opening 712 projected downward along the vertical direction as viewed from the storage unit 711 of the toner cartridge 70 is maximum is referred to as the "feeding position". In this embodiment, four developing units 50 are provided in the rotary 90, and the feeding position is determined for each of the developing units 50 and the toner cartridges 70.

Image Forming Operation

An image forming operation in this embodiment will be described with reference to FIGS. 1 and 2A. Upon receiving image information from an external device (not shown) such as a host computer, the video controller 30 transmits a print signal to the control unit 31 to start the image forming operation. First, in a standby orientation, the photosensitive drum 2 is rotated in the direction of the arrow (counterclockwise) in FIG. 1 in synchronization with the rotation of the intermediate transfer belt 10*a*. Then, the surface of the photosensitive drum 2 is uniformly charged by the charging roller 3.

When forming a color image on the sheet S, the rotary body 90 rotates in the direction of the arrow in FIG. 1 (clockwise) while supporting the developing units 50*y*, 50*m*, 50*c*, and 50*k* as follows. An electrophotographic process is then repeated while moving the developing rollers 51*y*, 51*m*, 51*c*, and 51*k* one by one to the development position.

First, the scanner 4 emits laser light based on image data corresponding to a yellow (y) image, and forms an electrostatic latent image corresponding to the yellow image on the surface of the photosensitive drum 2. In parallel with the formation of this electrostatic latent image, the motor M1 rotates the rotary body 90, causing the rotary body 90 to assume a yellow developing orientation. When the rotary body 90 is in the yellow developing orientation, the developing roller 51*y* is in the development position and develops the electrostatic latent image formed on the photosensitive drum 2 with yellow toner.

Here, in this embodiment, each of the developing rollers 51*y*, 51*m*, 51*c*, and 51*k* is an elastic roller having a metal shaft covered with rubber. At the development position, each of the developing rollers 51*y*, 51*m*, 51*c*, and 51*k* develops an electrostatic latent image while in contact with the photosensitive drum 2. That is, the image forming apparatus 1 in this embodiment employs a contact developing method. However, at the development position, each of the developing rollers 51*y*, 51*m*, 51*c*, and 51*k* may alternatively develop an electrostatic latent image in a state with a gap between the photosensitive drums 2. That is, the image forming apparatus 1 may employ a non-contact developing method.

After the yellow toner image is developed, the yellow toner image on the photosensitive drum 2 is primarily transferred to the intermediate transfer belt 10*a* by the primary transfer roller 11 located inside the intermediate transfer belt 10*a*.

Thereafter, the rotary body 90 is rotated to move the developing rollers 51*m*, 51*c*, and 51*k* to the development position in order, thereby forming toner images of the respective colors. That is, after the yellow toner image is formed on the intermediate transfer belt 10*a*, the rotary body 90 assumes a magenta developing orientation, and a magenta toner image is formed on the intermediate transfer belt 10*a*. After a magenta toner image is formed on the intermediate transfer belt 10*a*, the rotary body 90 assumes a cyan developing orientation, and a cyan toner image is formed on the intermediate transfer belt 10*a*. After the cyan toner image is formed on the intermediate transfer belt 10*a*, the rotary body 90 assumes a black developing orientation, and the black toner image is formed on the intermediate transfer belt 10*a*. When color images are formed successively, the rotary body 90 again assumes the yellow developing orientation after a black toner image is formed on the intermediate transfer belt 10*a*, and sequentially develops each color. When color images are not successively formed, the rotary body 90 returns to the standby orientation.

Then, a color image is formed on the intermediate transfer belt 10*a* by repeating primary transfer so as to overlap four-color toner images on the intermediate transfer belt 10*a*. Note that the secondary transfer roller 12 and the cleaning device 13 are not in contact with the intermediate transfer belt 10*a* before a color image is formed on the intermediate transfer belt 10*a*.

Meanwhile, the sheet S is fed from the sheet storage unit 300 located in the lower part of the apparatus body 1A by the pick-up roller 310. The sheet S is fed to the transport roller pair 320 in a state separated from other sheets S one by one by the feed roller 311 and the separation roller 312. The transport roller pair 320 sends the fed sheet S to a transfer section (secondary transfer section), which is a nipped part between the intermediate transfer belt 10*a* and the secondary transfer roller 12. The color image on the intermediate transfer belt 10*a* is transferred (secondary transfer) to the surface of the transported sheet S.

The sheet S with the color image transferred is sent to the fixing device 40. In the fixing device 40, the sheet S is heated and pressed, and the image is fixed onto the sheet S. The sheet S that has passed through the fixing device 40 is discharged as a product to the outside of the image forming apparatus 1.

Operation when Replacing Toner Cartridge

In an image forming apparatus of the rotary developing system, to and from which the toner cartridge 70 described in this embodiment is attachable and detachable, there may be a case where there is not sufficient toner in the developing unit 50 immediately after replacing the toner cartridge 70. The user usually replaces the toner cartridge 70 when prompted to replace the toner cartridge 70 by a notification from the image forming apparatus, or when recognizing a toner shortage from an output image. In these cases, the amount of toner in the developing unit 50 is often insufficient. Accordingly, it is preferable to perform the feeding operation immediately after replacing the toner cartridge 70.

In this embodiment, the feeding operation is performed to cause the toner cartridge 70 to pass through the aforementioned feeding position by rotating the rotary at least once, preferably more than once, after the toner cartridge 70 is replaced and before the development is performed.

The effect of the feeding operation, i.e., how much toner was fed to the developing unit 50, was evaluated as follows.

A user recognizes the amount of toner in the developing unit 50 being large or small after the feeding as the number of successive printable images with high-print coverage during actual use. Therefore, a comparison was made to check how many sheets with images having a print coverage of 50% (a solid image printed on the upper half of an A4 sheet) could be output successively.

First, as a preliminary experiment, the number of printable sheets with the developing-side storage unit 531 of the developing unit 50 filled with toner to the maximum (in a full state) is acknowledged. Here, single-sided printing is assumed, and the number of printable sheets can also be rephrased as the number of printable pages. Since it is considered that the number of printable sheets varies depending on the sheet size, a predetermined sheet size, e.g., A4 size, is used as the sheet size. It is desirable that the image to be formed is an image using only the toner of a specific color component. This is because the toner cartridge 70 of this embodiment has different volumes between black and the other colors, as shown in FIG. 1. Furthermore, the rotation of the rotary 90 involves in image formation using toner of more than one color components. Thus, a newly attached toner cartridge 70 is prevented from passing through the feeding position more than a predetermined number of times.

Figure 6:
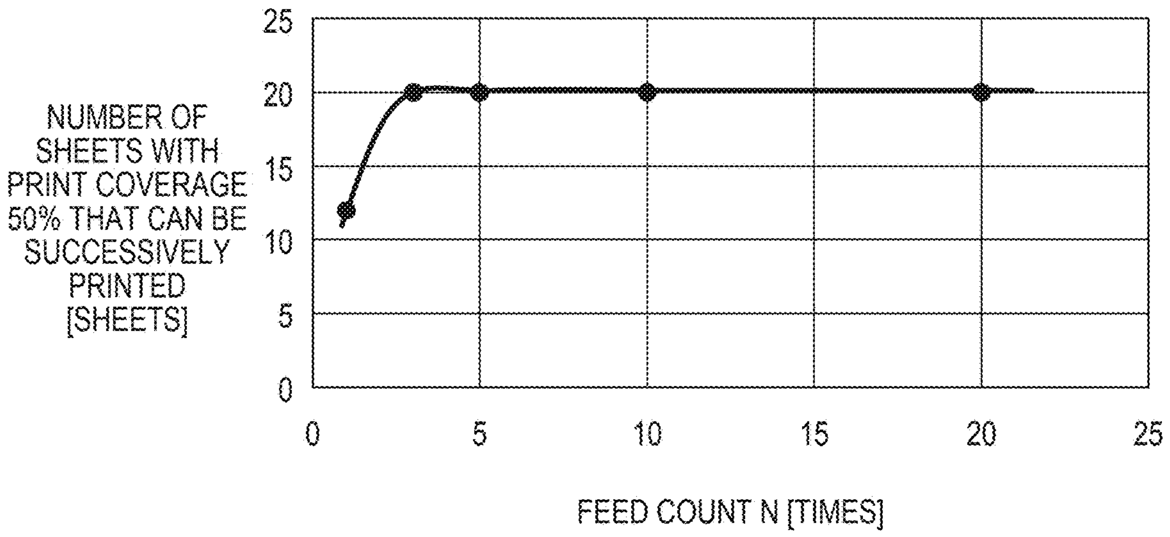
FIG. 6 is a graph showing the number of sheets on which an image with a print coverage of 50% can be printed per N times of feeding operation according to Embodiment 1.

FIG. 6 shows the number of successive printable sheets for an image having a print coverage of 50% when the toner cartridge 70 filled with toner is attached to the developing unit 50 and the rotary body 90 is rotated to perform N times the feeding operation of causing the toner cartridge 70 to pass through the feeding position. From the results of this, it can be said that even if the number of times that the toner is fed reaches three or more, the number of successive printable sheets is saturated at 20 sheets, which indicates the limit of the amount of toner that can be loaded to the developing unit 50 (i.e., almost full). That is, it can be said that, with the developing unit 50 in an almost full state, the number of successive printable sheets is 20 when an image with a print coverage of 50% is printed on a predetermined size of paper.

The following comparative study was made by performing the feeding operation performed in this embodiment.

Comparative example 1: After the toner cartridge 70 was attached, an image was formed without performing the feeding operation of causing the toner cartridge 70 to pass through the feeding position by rotating the rotary 90.

Example 1-1: After the toner cartridge 70 was attached, an operation (feeding operation 1) was performed to cause the toner cartridge 70 to pass through the feeding position once by rotating the rotary 90.

Example 1-2: After the toner cartridge 70 was attached, an operation (feeding operation 2) was performed to cause the toner cartridge 70 to pass through the feeding position three times by rotating the rotary 90.

A comparison was made between the above cases as to how many sheets of the predetermined size could be successively output while printing the aforementioned image with a print coverage of 50% thereon.

Figure 7:
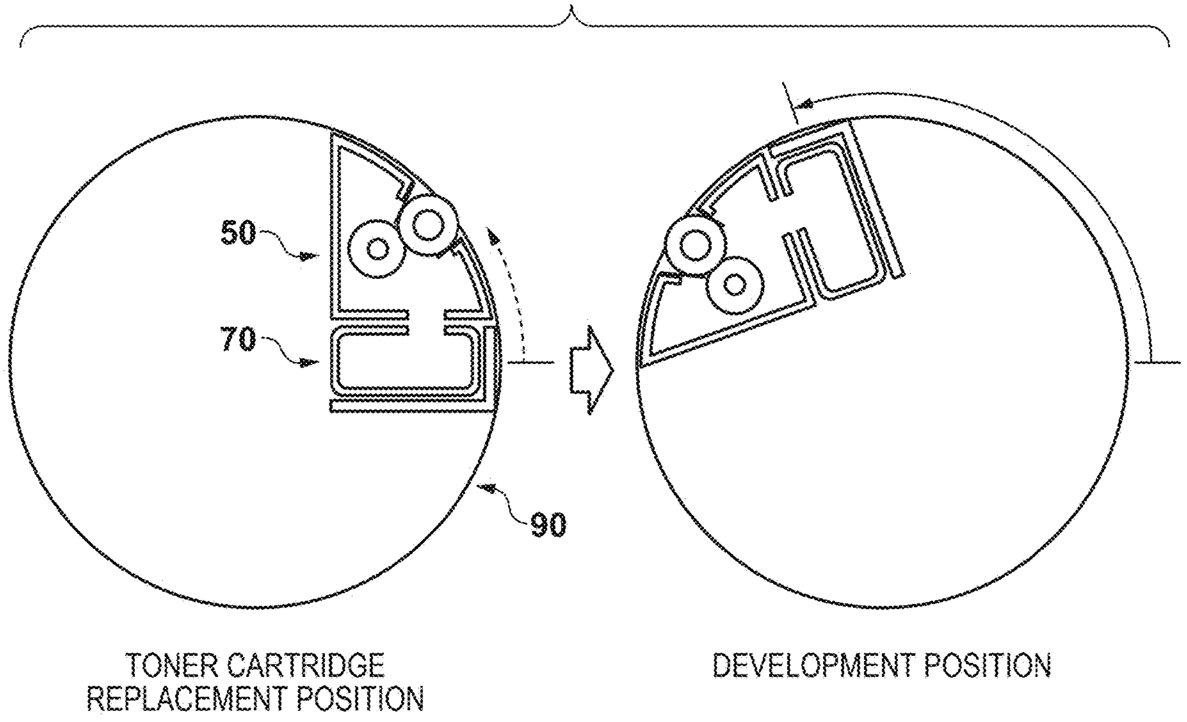
FIG. 7 is a schematic view showing a movement of the developing unit in comparative example 1 of Embodiment 1

FIG. 7 shows a specific movement of the developing unit 50 in comparative example 1. In comparative example 1, the toner cartridge 70 is attached at the “toner cartridge replacement position” shown in FIG. 7. Thereafter, the rotary body 90 rotates in the direction of the arrow (counterclockwise), and the attached toner cartridge 70 moves to the “development position” shown in FIG. 7 to perform development.

Figure 8:
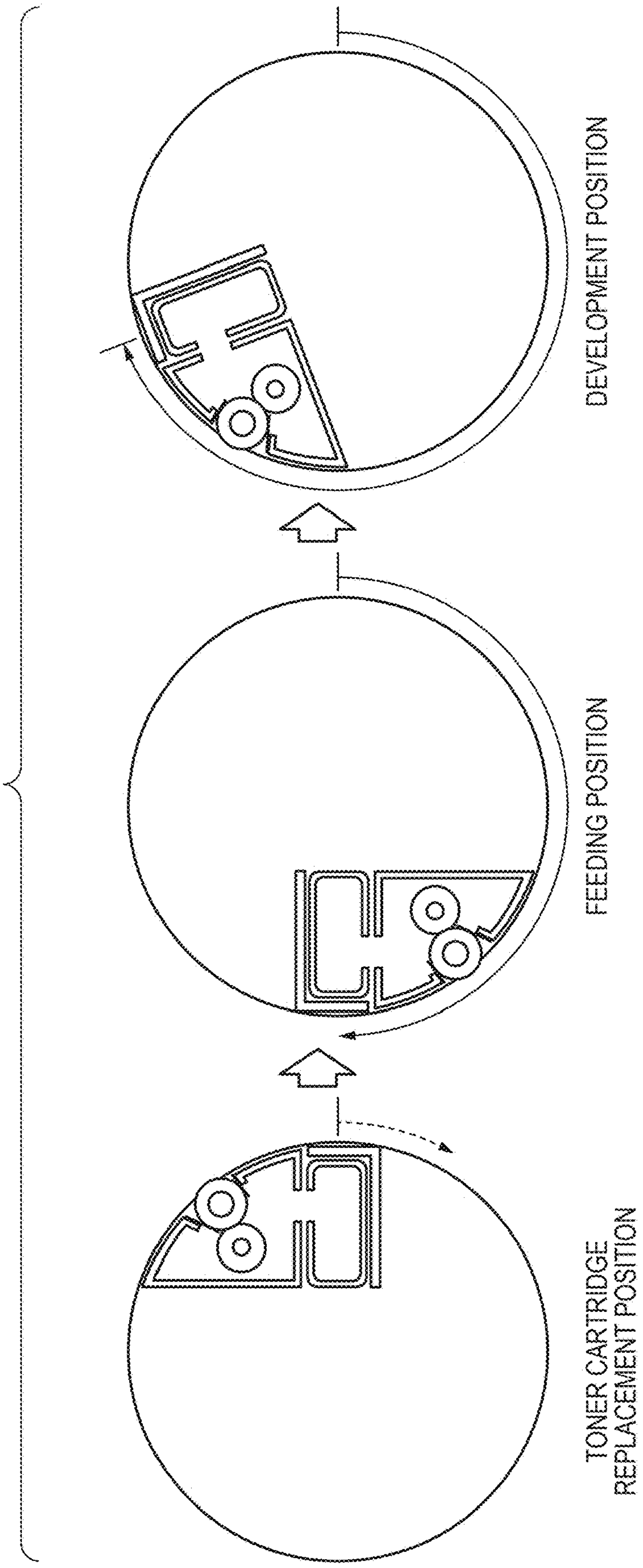
FIG. 8 is a schematic view showing a movement of the developing unit in example 1-1 of Embodiment 1

FIG. 8 shows a specific movement of the developing unit 50 in example 1-1. The toner cartridge 70 is attached at the “toner cartridge replacement position” shown in FIG. 8. Thereafter, the rotary body 90 rotates in the direction of the arrow (clockwise), and the toner cartridge 70 moves to the “development position” shown in FIG. 8 to perform development. While moving from the “toner cartridge replacement position” to the “development position” to perform development, the developing unit 50 passes through the feeding position once.

In example 1-2, the rotary body 90 is further rotated from the state where the toner cartridge 70 is in the “development position” in example 1-1, causing the developing unit 50 to pass through the feeding position three times before development. Specifically, the rotary 90 is further rotated twice in the clockwise direction in FIG. 8 from the state where the toner cartridge 70 is in the “development position” in example 1-1, causing the toner cartridge 70 to move again to the development position to perform development.

Table 1 shows the results of the comparison.

TABLE 1

| | Feeding operation | Passage through feeding position | Number of successive printable sheets for image with print coverage of 50% |
|---|---|---|---|
| Comp. Ex. 1 | Not performed | Not performed | 1 |
| Ex. 1-1 | Feeding operation 1 | Passed through feeding position once | 7 |
| Ex. 1-2 | Feeding operation 2 | Passed through feeding position three times | 20 |

In the case where the printing operation started as it was immediately after the toner cartridge in comparative example 1 was replaced, the number of successive printable sheets for an image with a print coverage of 50% was one. Considering that 20 sheets can be successively printed when the developing unit 50 is full, there is a high possibility that, in the case of comparative example 1, image defects such as insufficient density will occur when the user outputs an image with a high print coverage.

In contrast, seven sheets could be successively printed in example 1-1, in which the feeding operation was performed such that the developing unit passed through the feeding position once before printing. Furthermore, 20 sheets could be successively printed in example 1-2, in which the feeding operation was performed such that the developing unit 50 passed through the feeding position three times.

Even when the developing unit passes through the feeding position only once, seven sheets can be printed, as compared to one sheet in comparative example 1, and it can be said that toner is fed to the developing unit 50. Furthermore, it can be said that the feeding of the toner to the developing unit 50 is almost completed in a state after the developing unit 50 passes through the feeding position. Although not shown in Table 1, the number of successive printable sheets is about 15 when the developing unit 50 passes through the feeding position twice, as considered from FIG. 6. Compared to example 1-1, the number of successive printable sheets is twice or more, and although the feeding is not completed, it can be said that a substantial amount of toner has been loaded to the developing unit 50. Note that it is the result of this embodiment that the maximum amount of toner can be loaded to the developing unit 50 by causing the developing unit 50 to pass through the feeding position three times. This result is considered to vary depending on the capacity of the developing frame 53 of the developing unit 50, the size of the effective opening between the toner cartridge 70 and the developing unit 50, and the like. However, as in FIG. 6, it is naturally expected that there is a saturation point where the number of successive printable sheets does not change even when increasing the number of times that the toner is fed. The number of times that the toner is fed when the saturation point is reached is called a "saturation feed count".

As described above, the feeding operation of causing the toner cartridge 70 to pass through the feeding position is performed when the development is performed with the toner cartridge 70 for the first time after the toner cartridge 70 is replaced, thereby making it possible to compensate for and eliminate the toner shortage in the developing unit. Alternatively, when the toner cartridge 70 is replaced, the feeding operation of causing the toner cartridge 70 to pass through the feeding position may be performed immediately after the replacement.

Particularly, by causing, in the feeding operation, the toner cartridge to pass through the feeding position more than once immediately after the replacement of the toner cartridge, the amount of the toner loaded to the developing unit 50 can be increased by, for example, rotating the rotary 90 more than once. Desirably, the maximum amount of toner can be loaded to the developing unit 50 by setting the number of rotations to at least the saturation feed count. Further, as shown in FIG. 6, two or more feedings have the effect of increasing the amount of toner loaded to the developing unit 50. Thus, feeding toner twice or more times but less than the saturation feed count allows for the effect of increasing the amount of toner loaded in correspondence with the number of times that the toner is fed.

Note that the toner cartridge replacement position and the development position shown in FIGS. 7 and 8 are determined in accordance with the phase (phase of rotation or angular displacement) of the rotary 90. When a specific toner cartridge of interest is called a first cartridge, the rotational phase of the rotary 90 when the first toner cartridge is in the toner cartridge replacement position shown in FIGS. 7 and 8, for example, may be referred to as a first rotational phase, and the rotational phase of the rotary 90 when the first toner cartridge is in the development position may be referred to as a second rotational phase. Similarly, the rotational phase of the rotary 90 when the first toner cartridge is in the feeding position may be referred to as a third rotational phase. These rotational phases may also be referred to as a first angular displacement, a second angular displacement, and a third angular displacement, respectively.

Example of Control Procedure

Figure 15:
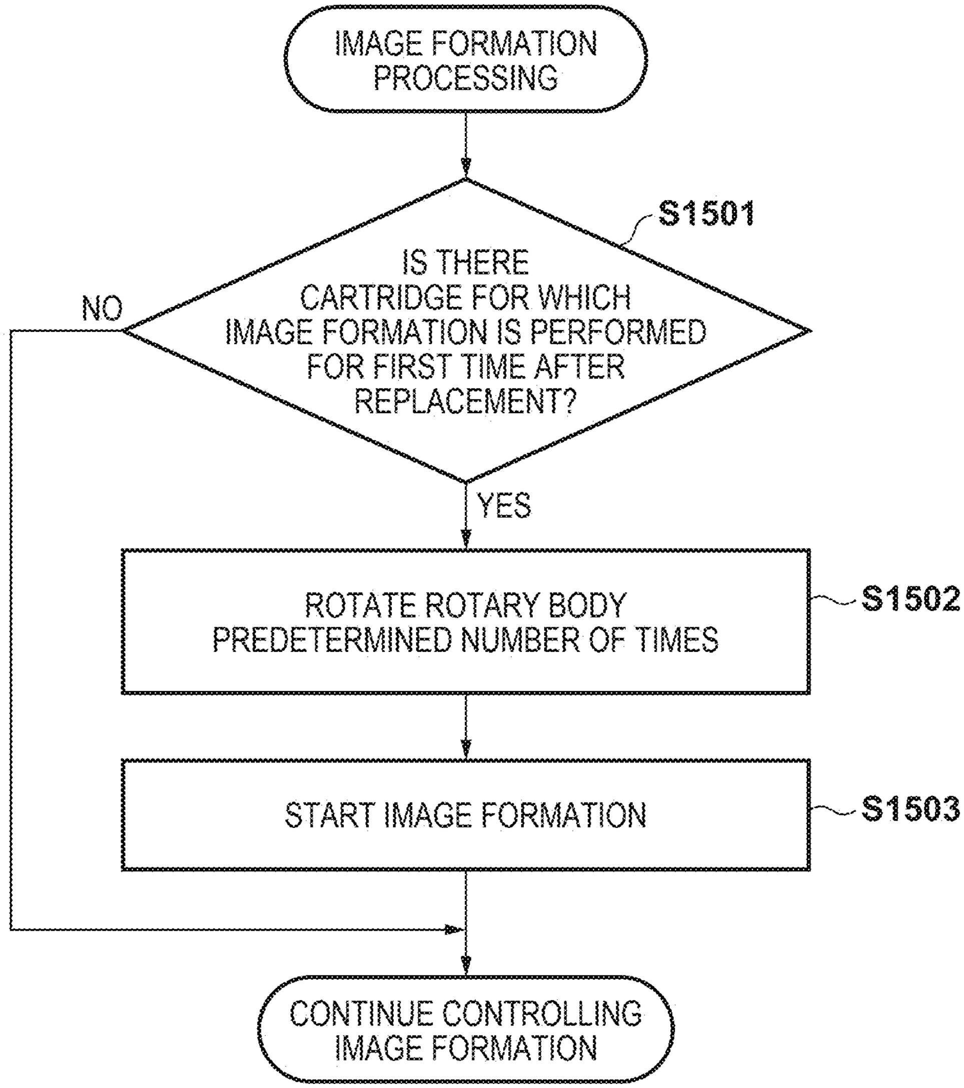
FIG. 15 is a flowchart showing an example of a control procedure when starting image formation processing.

FIG. 15 shows an example of a control procedure when the control unit 31 starts image formation processing is performed. This procedure is realized by the CPU (processor) 3101 of the control unit 31 loading and executing a program stored in the memory 3102.

When any of the toner cartridges 70 is replaced, the control unit 31 stores that the toner cartridge has been replaced and which of the toner cartridges 70*y*, 70*m*, 70*c*, and 70*k* has been replaced. The content stored here is held until development (image formation) using the replaced and newly attached toner cartridge 70 is performed, and is erased when development is performed.

The control unit 31 receives a print job and starts image formation processing after performing preprocessing necessary for image formation, such as rendering of the print job. At that time, first, the control unit 31 determines whether or not a toner cartridge for which image formation is performed for the first time after the replacement is stored (S1501). If there is a relevant toner cartridge, the rotary body 90 is rotated a predetermined number of times (S1502). The predetermined number of times for the rotation may be equal to a predetermined number of times that the newly attached toner cartridge 70 is to pass through the feeding position. In this embodiment, the predetermined number of times that the toner cartridge 70 passes through the feeding position is two or more. Consider the case where the rotary body 90 is rotated in the clockwise direction in FIGS. 2A and 2B, for example. If the replaced and newly attached toner cartridge 70 is in the replacement position, the rotary body 90 is rotated once and thereafter the newly attached toner cartridge 70 is moved to the development position. This toner cartridge then passes through the feeding position twice. That is, the aforementioned third rotational phase of the rotary is passed twice. That is, in this case, the rotary body 90 may be rotated "the number of times the toner cartridge 70 passes through the feeding position—1". Thereafter, the newly attached toner cartridge 70 is moved to the development position for development using this toner cartridge 70, thus moving to the development position via the feeding position once again. Specifically, if the predetermined number of times that the toner cartridge 70 passes through the feeding position is three, the rotary body 90 may be rotated twice in S1502.

Thereafter, image formation starts (S1503). At this time, image formation may be performed for each color component in a predetermined order, e.g., in the order of y, m, c, and k.

Further, it is determined in S1501 whether or not image formation is performed for the first time after the replacement of the toner cartridge, but any other condition (predetermined condition) may be used. In this case, S1502 is performed if the control unit 31 determines that the predetermined condition is satisfied. The condition may be, for example, that image formation is performed for the first time after the image forming apparatus recovers from a jam (failure), or that image formation is performed for the first time after the image forming apparatus recovers from a sleep state after a long time period (predetermined time period).

Alternatively, "image formation is performed for the first time" may be eliminated from the condition in S1501. That is, S1502 may be performed if a predetermined condition is satisfied, e.g., the toner cartridge 70 has been replaced, or the image forming apparatus has recovered from a jam (failure) or recovered from the sleep state after a long time period (predetermined time period). In S1502, the rotary body 90 is rotated a predetermined number of times. In this case, in S1503, image formation may be performed if there is a job to be processed.

Further, the number of rotations of the rotary body 90 in S1502 may be variable. The number of rotations is the number of times that the rotary 90 is rotated about the axis (i.e., revolved), and may be replaced with "the number of revolutions". The number of rotations may be designated by an administrator or the like. If the flow in FIG. 15 starts in conjunction with the execution of a received job (print job), the number of rotations before development (the number of rotations in S1502) may be varied in accordance with the number of sheets to be printed for the received job. For example, thresholds may be set for the number of sheets to be printed for the job, and if the number of sheets to be printed is greater than or equal to a first threshold and less than a second threshold, the rotary body 90 may be rotated a first predetermined number of times, and if the number of sheets to be printed is greater than or equal to the second threshold and less than a third threshold, the rotary body 90 may be rotated a second predetermined number of times.

Further, in the case of full-color printing, the rotary body 90 is rotated to print one page. Therefore, it is considered that the toner cartridge 70 passes through the feeding position each time image formation is performed for one page. Accordingly, the aforementioned predetermined condition may be that the job to be executed or the printing job being executed is a job for forming a monochrome image using only a toner of a specific color component, such as printing of a black-and-white image. The "toner of a specific color component" is the toner fed by the toner cartridge 70 newly attached by replacement. Monochrome images include not only black, but also images storing only yellow, only cyan, or only magenta. In such a case, it is possible that multiple pages of image formation is performed successively without the rotation of the rotary body 90, and it is possible that if the amount of toner in the developing unit 50 is small, the formed image will be defective. Therefore, the rotation of the rotary body 90 in S1502 is performed prior to image formation, thereby making it possible to suppress the defect in image formation.

Embodiment 2

Figure 9:
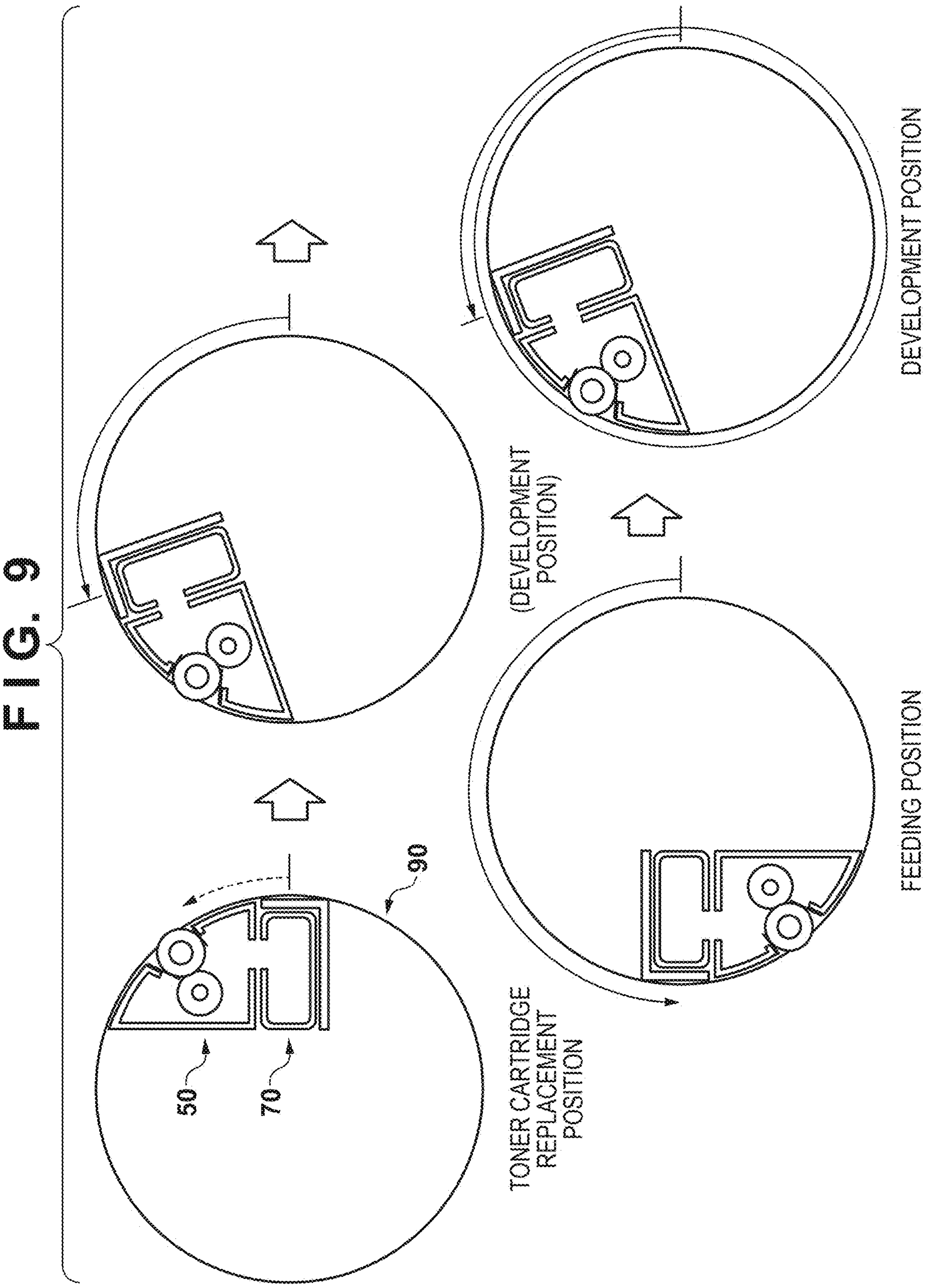
FIG. 9 is a schematic view showing a movement of the developing unit according to Embodiment 2.

In the first embodiment, the feeding operation is performed such that the rotary body 90 is rotated clockwise so as to be set in the feeding position, while in this embodiment, the feeding operation is performed such that the rotary body 90 is rotated counterclockwise so as to be set in the feeding position. FIG. 9 shows a specific movement of the developing unit 50 of this embodiment.

After the toner cartridge 70 is attached in the "toner cartridge replacement position" as shown in FIG. 9, the rotary body 90 is rotated in the direction of the arrow (counterclockwise) when development using this toner cartridge 70 is performed for the first time. Once the toner cartridge 70 passes through the development position and then the feeding position, it then reaches the development position, and development is performed.

This embodiment is the same as the first embodiment in that toner is fed to the developing unit 50 after the toner cartridge 70 passes through the feeding position. Meanwhile, in this embodiment, a larger amount of toner than in the first embodiment is fed to the vicinity of the supply roller 52. By feeding toner to the vicinity of the supply roller 52, mixing of the toner in the developing unit 50 and the toner in the toner cartridge 70 is promoted further. This makes it possible to prevent fogging caused by insufficient mixing of new and old toner.

Figure 10A:
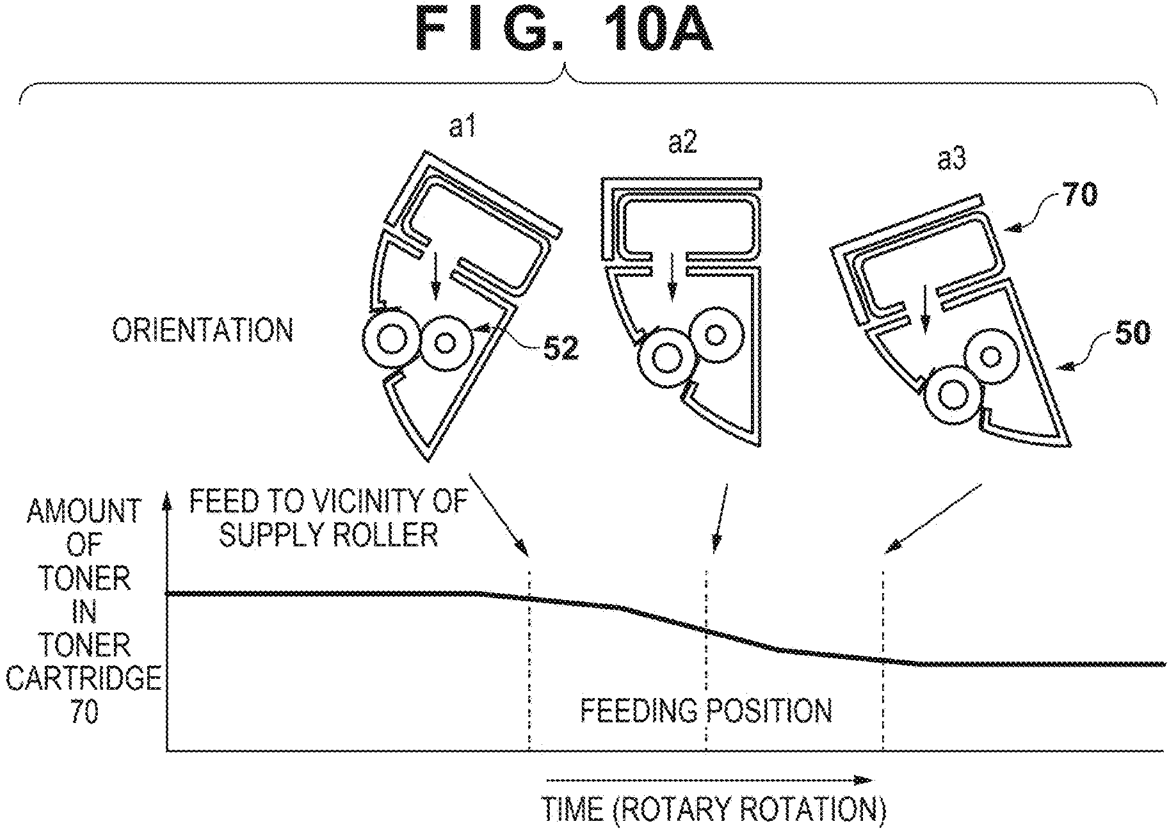
FIG. 10A is a schematic view showing the orientations of a toner cartridge 70 and a developing unit 50 in a feeding process in Embodiment 2, and a graph showing the amount of toner in the toner cartridge 70.

FIG. 10A schematically shows the orientations of the toner cartridge 70 and the developing unit 50 at different angles in the feeding process in which they pass through the feeding position in this embodiment, and the amount of toner in the toner cartridge 70 at each point in time. That is, the figure shows the orientations of the toner cartridge 70 and the developing unit 50 before and after passing through the feeding position when the rotary body 90 rotates counterclockwise and passes through the feeding position.

Figure 10B:
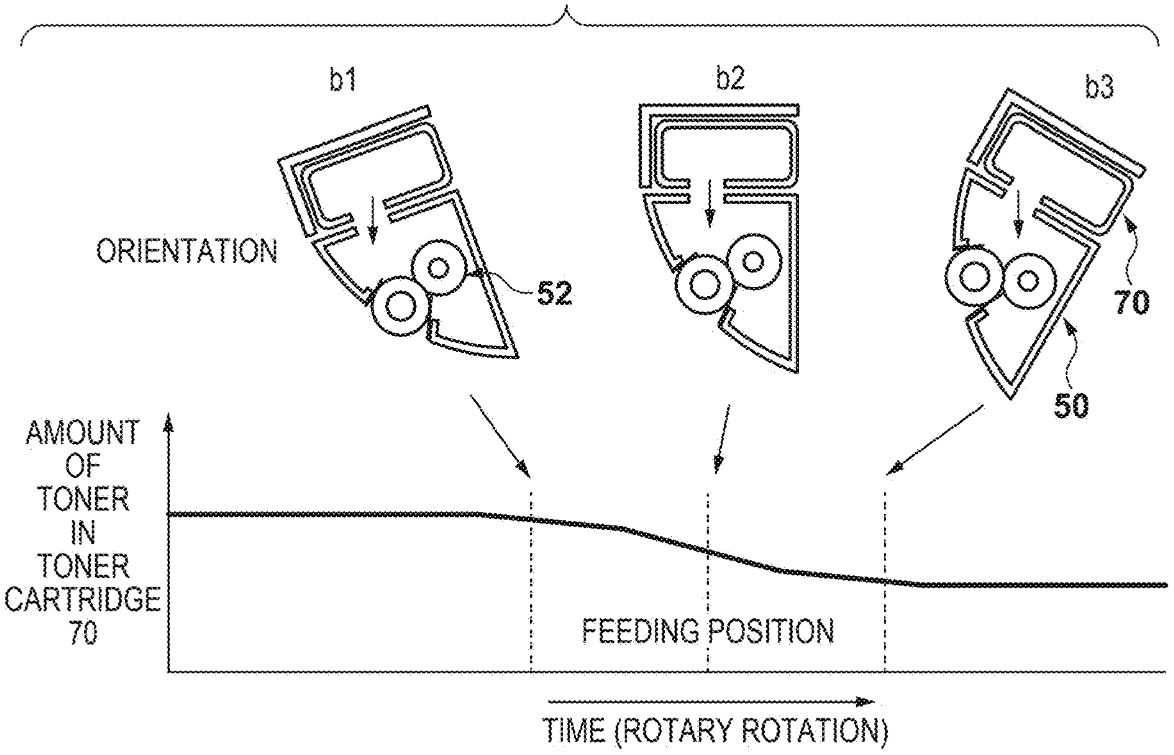
FIG. 10B illustrates comparison with Embodiment 1.

FIG. 10B schematically shows the orientations of the toner cartridge 70 and the developing unit 50 at different angles in the feeding process in which they pass through the feeding position in the first embodiment, and the amount of toner in the toner cartridge 70 at each point in time. That is, the figure shows the orientations of the toner cartridge 70 and the developing unit 50 before and after passing through the feeding position when the rotary body 90 rotates clockwise and passes through the feeding position.

In this embodiment, toner is fed from the toner cartridge 70 to the developing unit 50 while changing their orientations in the order of a1 to a2 to a3, whereas in the first embodiment, toner is fed while changing their orientations in the order of b1 to b2 to b3. The orientation a2 and the orientation b2 are their respective orientations at the "feeding position", but toner is also fed to the developing unit 50 in the orientations before and after assuming those orientations.

The amount of toner in the toner cartridge 70 decreases with the feeding. Thus, the amount of toner in the first half of the feeding process, including the orientations a1 and b1, is relatively large during an entire feeding process, while the amount of toner at the timing of the orientations a3 and b3 is relatively small.

The amount of toner fed to the developing unit 50 is substantially proportional to the amount of toner in the toner cartridge 70, and the amount of toner fed increases as the amount of feedable toner increases.

In this embodiment, in the first half of the feeding process during which the amount of toner in the toner cartridge 70 is relatively large, the rotary body 90 is rotated counterclockwise to perform the feeding operation such that the supply roller 52 is positioned immediately below the opening region effective for the feeding of toner when the discharge opening 712 and the receiving opening 532 are in communication.

This allows more toner to be fed to the vicinity of the supply roller 52 than in the first embodiment, and the mixing of the toner in the developing unit 50 and that in the toner cartridge 70 is further promoted. Image formation was actually performed immediately after the replacement of the toner cartridge 70, and fogging on the first image-formed sheet was compared with that of the first embodiment.

Fogging was measured using REFLECTMETER MODELTC-6DS manufactured by TokyoDenshoku. A green filter was used as a filter, and the following equation was used in calculation.

$$\text{Fogging (reflectance) (\%)} = \text{reflectance on standard paper (\%)} - \text{reflectance of non-image area of sample (\%)}$$

It can be said that if fogging on the paper is 2.0% or less, the image quality is good in general.

As a result of measuring fogging on the paper, the fogging was 0.8% in the first embodiment, whereas the fogging in this embodiment was 0.5%. In either case, the fogging is not a problematic level compared to 2%, which is practically problematic. However, this embodiment provides a larger margin and can be considered more advantageous in terms of fogging than the first embodiment.

That is, in this embodiment, during the first image forming operation after replacing the toner cartridge 70, or immediately after the replacement, the rotary 90 is rotated, for example, counterclockwise in FIGS. 2A and 2B to move that toner cartridge 70 from the replacement position to the development position via the feeding position. "Counterclockwise" means the direction of rotation in which the toner cartridge 70 in the replacement position moves upward at the initial stage of the rotation of the rotary 90, and the direction of rotation in which the toner cartridge 70 reaches the feeding position after passing through the development position. Then, the rotary 90 is further rotated via the feeding position, and reaches the development position again.

Development is performed at that position. As described in the first embodiment, the greater the number of times that the rotary 90 passes through the feeding position, the more effective, until the number of saturation feed count is reached. Accordingly, in this embodiment, control may also be performed to rotate the rotary 90 so as to pass through the feeding position more than once.

The control procedure at the start of development performed by the control unit 31 in this embodiment is substantially the same as that in FIG. 15. However, the number of rotations of the rotary in S1502 differs from that in the first embodiment. In the first embodiment, when the newly attached toner cartridge 70 is in the replacement position, the rotary body 90 is rotated "the number of times that the rotary body 90 passes through the feeding position—1" in S1502. However, in this embodiment, the toner cartridge 70 moving from the replacement position to the development position does not pass through the feeding position. Accordingly, in this embodiment, the rotary body 90 is rotated the same number of times as the number of times that "the rotary body 90 passes through the feeding position" in S1502.

By performing this control, even in this embodiment, after replacing the toner cartridge 70, the toner cartridge 70 can pass through the feeding position a predetermined number of times prior to the first development using the newly attached toner cartridge 70.

Other Embodiments

Although the present invention has been described above with reference to specific examples, the present invention is not limited to the above-described embodiments.

In the first and second embodiments, the feeding operation of rotating the rotary body 90 clockwise and counterclockwise, respectively, to pass through the feeding position has been described. Regarding the rotational direction of the rotary body 90, the feeding operation may also be performed by combining the clockwise rotation and the counterclockwise rotation after the replacement of the toner cartridge 70, if the rotary body 90 passes through the feeding position.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-070813, filed Apr. 24, 2024, which is hereby incorporated by reference herein in its entirety.

What is claimed is:

1. An image forming apparatus to and from which a cartridge containing a developer is attachable and detachable, the image forming apparatus comprising:

a rotary capable of containing the cartridge attached thereto and including a developing unit configured to contain the developer supplied from a discharge opening of the cartridge;

a drive mechanism configured to rotate the rotary; and a controller configured to control the drive mechanism, wherein the developing unit has a receiving opening for receiving the developer supplied from the discharge opening, the controller comprises:

at least one memory storing instructions; and at least one processor that is in communication with the at least one memory and that, when executing the instructions, cooperates with the at least one memory to execute processing, the processing including:

controlling the drive mechanism to rotate the rotary to a first rotational phase in which the cartridge is able to be replaced when replacing the cartridge;

rotating the rotary to a second rotational phase when developing an image using the developer supplied from the cartridge and contained in the developing unit; and controlling the drive mechanism to rotate the rotary in the first rotational phase so as to pass through a third rotational phase more than once and then reach the second rotational phase when an image forming operation is performed for a first time after the cartridge is replaced, if it is determined that a predetermined condition is satisfied, when the rotary is located in the first rotational phase, a direction from the discharge opening toward the receiving opening is an upward direction, and when the rotary is located in the third rotational phase, the direction from the discharge opening toward the receiving opening is a downward direction.

2. The image forming apparatus according to claim 1, wherein in the second rotational phase, an area projected in a vertical direction of the discharge opening of the cartridge is smaller than an area projected in the vertical direction of the discharge opening of the cartridge in the third rotational phase.

3. The image forming apparatus according to claim 1, wherein the processing includes controlling the drive mechanism to rotate the rotary in the first rotational phase more than once, if it is determined that the predetermined condition is satisfied.

4. The image forming apparatus according to claim 1, wherein the processing includes controlling the drive mechanism to rotate the rotary in the first rotational phase to the second rotational phase, then rotate the rotary to the third rotational phase, and thereafter further rotate the rotary, if the predetermined condition is satisfied.

5. The image forming apparatus according to claim 1, wherein the processing includes changing the number of rotations of the rotary in accordance with the number of sheets to be printed by a print job to be executed or a print job being executed.

6. The image forming apparatus according to claim 1, wherein the predetermined condition includes that the cartridge has been replaced.

7. The image forming apparatus according to claim 6, wherein the predetermined condition includes that a print job to be executed or a print job being executed is a print job for forming a monochrome image using a developer supplied from the replaced cartridge.

8. The image forming apparatus according to claim 1, wherein the rotary is capable of containing a plurality of cartridges containing developers, including the cartridge, and includes a plurality of developing units configured to contain the developers supplied through openings of the plurality of cartridges.

* * * * *